US012218454B2

(12) United States Patent
Purdy et al.

(10) Patent No.: US 12,218,454 B2
(45) Date of Patent: Feb. 4, 2025

(54) CONNECTOR FOR HARDLINE COAXIAL CABLE

(71) Applicant: PPC BROADBAND, INC., East Syracuse, NY (US)

(72) Inventors: Eric J. Purdy, Constantia, NY (US); Noah P. Montena, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 155 days.

(21) Appl. No.: 17/857,933

(22) Filed: Jul. 5, 2022

(65) Prior Publication Data

US 2022/0336994 A1 Oct. 20, 2022

Related U.S. Application Data

(63) Continuation of application No. 17/144,126, filed on Jan. 7, 2021, now Pat. No. 11,381,028.

(Continued)

(51) Int. Cl.

*H01R 13/512* (2006.01)
*H01R 9/05* (2006.01)

(Continued)

(52) U.S. Cl.

CPC ......... *H01R 13/512* (2013.01); *H01R 9/0521* (2013.01); *H01R 13/426* (2013.01); *H01R 24/40* (2013.01); *H01R 2103/00* (2013.01)

(58) Field of Classification Search

CPC .. H01R 9/0521; H01R 13/426; H01R 13/512; H01R 24/40

See application file for complete search history.

(56) References Cited

U.S. PATENT DOCUMENTS 3,706,958 A 12/1972 Blanchenot
4,923,412 A 5/1990 Morris (Continued)

FOREIGN PATENT DOCUMENTS

EP 3179565 A1 6/2017

OTHER PUBLICATIONS

Search Report dated Mar. 26, 2021 in corresponding International Application No. PCT/US2021/012563, 4 pages.
Written Opinion dated Mar. 26, 2021 in corresponding International Application No. PCT/US2021/012563, 10 pages.

*Primary Examiner* — Oscar C Jimenez
(74) *Attorney, Agent, or Firm* — MH2 TECHNOLOGY LAW GROUP LLP

(57) ABSTRACT

A coaxial cable connector includes a nut housing having a rearward cable receiving end and a forward end opposite said rearward end, a front nut assembly coupled to the forward end of the nut housing, and a conductive metal tubular insert shaft supported within the nut housing or the front nut assembly. The front nut assembly includes an entry body housing and a conductive terminal pin extending from a forward end of the front nut assembly, and the conductive metal tubular insert shaft has a rearward end portion. A nonconductive plastic tubular support sleeve has a forward end portion coupled with the rearward end portion of the conductive metal tubular insert shaft, a tubular gripping ferrule radially surrounds the metal insert shaft and the plastic support sleeve, and a tubular outer sleeve radially surrounds at least a portion of said gripping ferrule. The gripping ferrule and the tubular outer sleeve are configured to be moved relative to one another in an axial direction such that the gripping ferrule and the tubular outer sleeve are configured to engage one another, thereby causing the gripping ferrule to radially compress around the conductive (Continued)

metal tubular insert shaft and the nonconductive plastic tubular support sleeve.

20 Claims, 14 Drawing Sheets

Related U.S. Application Data

(60) Provisional application No. 63/031,597, filed on May 29, 2020, provisional application No. 62/958,123, filed on Jan. 7, 2020.

(51) Int. Cl.

| | |
|---|---|
| ***H01R 13/426*** | (2006.01) |
| ***H01R 24/40*** | (2011.01) |
| ***H01R 103/00*** | (2006.01) |

(56) References Cited

U.S. PATENT DOCUMENTS

| | | | | |
|---|---|---|---|---|
| 5,352,134 | A | 10/1994 | Jacobsen et al. | |
| 5,651,698 | A | 7/1997 | Locati et al. | |
| 6,019,636 | A | 2/2000 | Langham | |
| 6,102,738 | A | 8/2000 | Macek et al. | |
| 11,381,028 | B2 * | 7/2022 | Purdy | H01R 13/6581 |
| 2003/0224657 | A1 | 12/2003 | Malloy | |
| 2005/0085125 | A1 | 4/2005 | Montena | |
| 2005/0277330 | A1 | 12/2005 | Kisling et al. | |
| 2015/0340819 | A1 | 11/2015 | Chen | |
| 2019/0036281 | A1 * | 1/2019 | Watkins | H01R 9/0524 |
| 2022/0209476 | A1 * | 6/2022 | Ivancic | H01R 24/40 |
| 2023/0187868 | A1 * | 6/2023 | Purdy | H01R 9/0524 439/578 |

* cited by examiner

CONNECTOR FOR HARDLINE COAXIAL CABLE

CROSS-REFERENCE TO RELATED APPLICATIONS

This application is a continuation of U.S. Nonprovisional application Ser. No. 17/144,126 filed Jan. 7, 2021, pending, which claims the benefit of U.S. Provisional Application No. 62/958,123, filed Jan. 7, 2020, and U.S. Provisional Application No. 63/031,597, filed May 29, 2020, the disclosures of which are hereby incorporated by reference herein in their entireties.

BACKGROUND

The present invention relates generally to connectors for terminating coaxial cable. More particularly, the present invention relates to axially compressible connectors for hardline or semi-rigid coaxial cables.

Coaxial cables are commonly used in the cable television industry to carry cable TV signals to television sets in homes, businesses, and other locations. A hardline coaxial cable may be used to carry the signals in distribution systems exterior to these locations and a flexible coaxial cable is then often used to carry the signals within the interior of these locations. Hardline or semi-rigid coaxial cable is also used where a high degree of radio-frequency (RF) shielding is required.

The hardline cable includes a solid wire core or inner conductor, typically of copper or copper-clad aluminum, surrounded by a solid tubular outer conductor. The outer conductor is also usually made of copper or aluminum. Dielectric material or insulation separates the inner and outer conductors. The outer conductor is covered with a cable jacket or sheath of plastic to provide protection against corrosion and weathering.

Threaded cable connectors, as shown in U.S. Pat. Nos. 5,352,134 and 6,019,636, have been employed to provide more even compression of the connector. Such connectors typically utilize some form of clamping mechanism that radially compresses the outer conductor of the cable against a tubular insert shaft upon axial threaded movement of the connector components to retain the cable in the hardline connector. The clamping mechanism may include a conical sleeve surrounded by an outer sleeve which forces the conical sleeve to radially compress upon axial movement of the outer sleeve with respect to the conical sleeve. The length of the conical closure sleeve typically closes the full length of the mechanism with equal forces around the circumference of the insert shaft. The resulting forces closing down on the coaxial cable compress the cable around the outside of the insert shaft creating a formed bond on the outside surface.

The ability of a connector to make a solid ground connection to the outer sheath of hardline CATV cables has always been required to achieve long term performance with respect to RFI shielding effectiveness of the connector as well as facilitate proper signal transmission through the connector with minimal loss or disruption of said signal. Connectors throughout the CATV industry have been made with all metal mandrel support sleeves and also have been made with all plastic mandrel support sleeves. While the all metal holds up very well strength wise over time and temperature, the all plastic versions are susceptible to creep and can weaken over time and temperature.

There are varying levels of difficulties with different types of cable sold in the industry. For example, cables known as P3 or TX or T10 are often on the simpler side of things when it comes to making a solid ground connection between the cable and the connector. This is mostly due to the fact that all dielectric foam is removed from the inside of the outer conductor during the cable preparation process, prior to installing the connector. This removal of the dielectric foam allows for easy ground connection between the inside diameter of the cable and the outside diameter of the mandrel, which is typically made of a conductive metal. In the case of cables known as QR or even MC2, the cable preparation process leaves a thin film of non-conductive dielectric material on the inside diameter of the cable outer conductor. This layer prevents a solid ground connection being made as described above and seems to lengthen the signal pathway that the RF energy needs to travel as it propagates through the connector having a metal mandrel support sleeve, as shown in broken lines in FIG. 4. This extended pathway leads to the signal becoming out of phase and can cause "ringing" or harmonic in the signal response. This poor ground connection also leads to weakened RFI shielding performance and can also show up as a suckout or notch in the insertion loss performance of the connector.

It may be desirable to provide a connector that overcomes one or more of the aforementioned disadvantages of hardline connectors having an all metal or all plastic support sleeve. That is, it may be desirable to provide a connector having a hybrid metal-plastic support sleeve.

SUMMARY

In accordance with various embodiments of the present disclosure, a coaxial cable connector includes a nut housing having a rearward cable receiving end and a forward end opposite said rearward end, a front nut assembly coupled to the forward end of the nut housing, and a conductive metal tubular insert shaft supported within the nut housing or the front nut assembly. The front nut assembly includes an entry body housing and a conductive terminal pin extending from a forward end of the front nut assembly, and the conductive metal tubular insert shaft has a rearward end portion. A nonconductive plastic tubular support sleeve has a forward end portion coupled with the rearward end portion of the conductive metal tubular insert shaft, a tubular gripping ferrule radially surrounds the metal insert shaft and the plastic support sleeve, and a tubular outer sleeve radially surrounds at least a portion of said gripping ferrule. The gripping ferrule and the tubular outer sleeve are configured to be moved relative to one another in an axial direction such that the gripping ferrule and the tubular outer sleeve are configured to engage one another, thereby causing the gripping ferrule to radially compress around the conductive metal tubular insert shaft and the nonconductive plastic tubular support sleeve.

In some aspects, the conductive metal tubular insert shaft includes an engagement structure configured to engage an engagement structure of the nonconductive plastic tubular support sleeve to couple the conductive metal tubular insert shaft with the nonconductive plastic tubular support sleeve.

According to various aspects, the coaxial cable connector further includes a back nut assembly configured to be coupled with the rearward end of the nut housing, and the back nut assembly including an end cap. In some aspects, a mid nut assembly includes the nut housing, the nonconductive plastic tubular support sleeve, and the tubular gripping ferrule. In various aspects, the mid nut assembly further includes the conductive metal tubular insert shaft and the tubular outer sleeve.

According to some aspects, a back nut assembly includes the nut housing, the nonconductive plastic tubular support sleeve, and the tubular gripping ferrule.

In some aspects, the front nut assembly includes the nonconductive plastic tubular support sleeve and the conductive metal tubular insert shaft.

In accordance with various embodiments of the present disclosure, a coaxial cable connector includes a nut housing having a rearward cable receiving end and an opposite forward end, a front nut assembly coupled to the forward end of the nut housing, a conductive metal tubular insert shaft supported within the nut housing or the front nut assembly, a nonconductive plastic tubular support sleeve having a forward end portion coupled with a rearward end portion of the conductive metal tubular insert shaft, a tubular gripping ferrule radially surrounding the metal insert shaft and the plastic support sleeve, and a tubular outer sleeve radially surrounding at least a portion of said gripping ferrule. The gripping ferrule and the tubular outer sleeve are configured to be moved relative to one another in an axial direction such that the gripping ferrule and the tubular outer sleeve are configured to engage one another, thereby causing the gripping ferrule to radially compress around the conductive metal tubular insert shaft and the nonconductive plastic tubular support sleeve.

According to some aspects, the conductive metal tubular insert shaft includes an engagement structure configured to engage an engagement structure of the nonconductive plastic tubular support sleeve to couple the conductive metal tubular insert shaft with the nonconductive plastic tubular support sleeve.

In various aspects, a back nut assembly is configured to be coupled with the rearward end of the nut housing and includes an end cap. According to some aspects, a mid nut assembly includes the nut housing, the nonconductive plastic tubular support sleeve, and the tubular gripping ferrule. In some aspects, the mid nut assembly further includes the conductive metal tubular insert shaft and the tubular outer sleeve.

According to some aspects, a back nut assembly includes the nut housing, the nonconductive plastic tubular support sleeve, and the tubular gripping ferrule.

In some aspects, the front nut assembly includes the nonconductive plastic tubular support sleeve and the conductive metal tubular insert shaft.

In various aspects, the front nut assembly includes an entry body housing and a conductive terminal pin extending from a forward end of the front nut assembly.

In accordance with various embodiments of the present disclosure, a coaxial cable connector includes a nut assembly having a rearward cable receiving end and an opposite forward end, a hybrid inner sleeve comprising a conductive forward portion and a nonconductive rearward portion, a tubular gripping ferrule radially surrounding the metal insert shaft and the plastic support sleeve, and a tubular outer sleeve radially surrounding at least a portion of said gripping ferrule. The gripping ferrule and the tubular outer sleeve are configured to be moved relative to one another in an axial direction such that the gripping ferrule and the tubular outer sleeve are configured to engage one another, thereby causing the gripping ferrule to radially compress around the hybrid inner sleeve.

According to some aspects, the conductive forward portion of the inner sleeve is a conductive metal tubular insert shaft, the conductive metal tubular insert shaft having a rearward end portion, and the nonconductive rearward portion is a nonconductive plastic tubular support sleeve having a forward end portion coupled with the rearward end portion of the conductive metal tubular insert shaft.

In some aspects, the conductive forward portion includes an engagement structure configured to engage an engagement structure of the nonconductive rearward portion to couple the conductive forward portion with the nonconductive rearward portion.

According to various aspects, a back nut assembly is configured to be coupled with the rearward end of the nut housing and includes an end cap. In some aspects, a mid nut assembly includes the nut housing, the nonconductive plastic tubular support sleeve, and the tubular gripping ferrule. In various aspects, the mid nut assembly further includes the conductive metal tubular insert shaft and the tubular outer sleeve.

In various aspects, a back nut assembly includes the nut housing, the nonconductive plastic tubular support sleeve, and the tubular gripping ferrule.

According to some aspects, the coaxial cable connector further includes a front nut assembly configured to be coupled with the nut housing, the front nut assembly including the nonconductive plastic tubular support sleeve and the conductive metal tubular insert shaft.

In some aspects, the coaxial cable connector further includes a front nut assembly configured to be coupled with the nut housing, and the front nut assembly includes an entry body housing and a conductive terminal pin extending from a forward end of the front nut assembly.

Various aspects of the hardline coaxial connector, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Referring first to FIGS. 1-4, a conventional connector 10 is depicted. The connector 10 is for hardline or semi-rigid coaxial cables. The connector 10 includes a front nut assembly 12 and a back nut assembly 14 that are configured to be removably connected to one another while providing both an electrical and mechanical connection therebetween.

Figure 1:
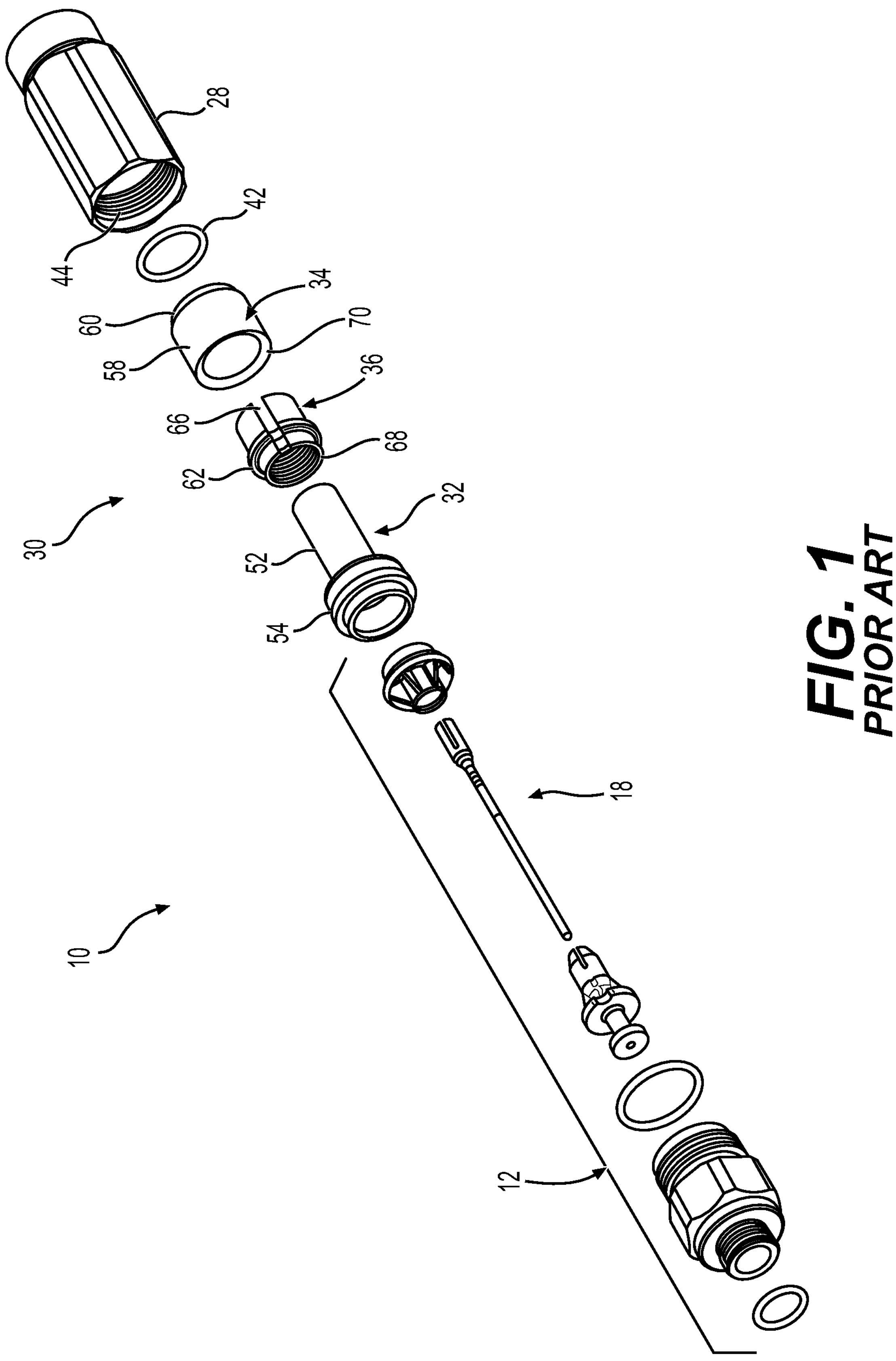
FIG. 1 PRIOR ART
FIG. 1 is an exploded perspective view of a conventional hardline connector.
Figure 2:
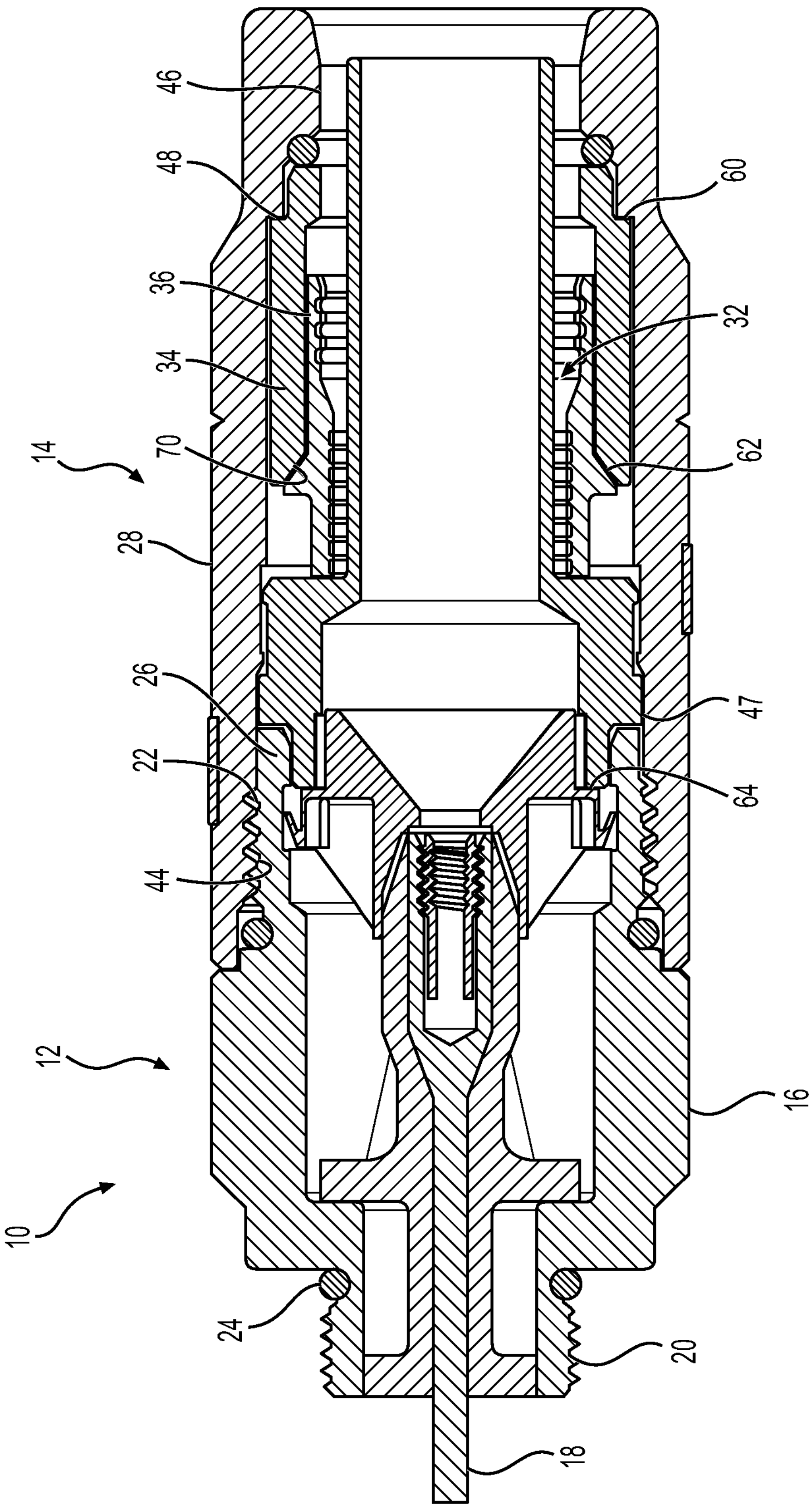
FIG. 2 PRIOR ART
FIG. 2 is a side cross-sectional view of the connector of FIG. 1.
Figure 3:
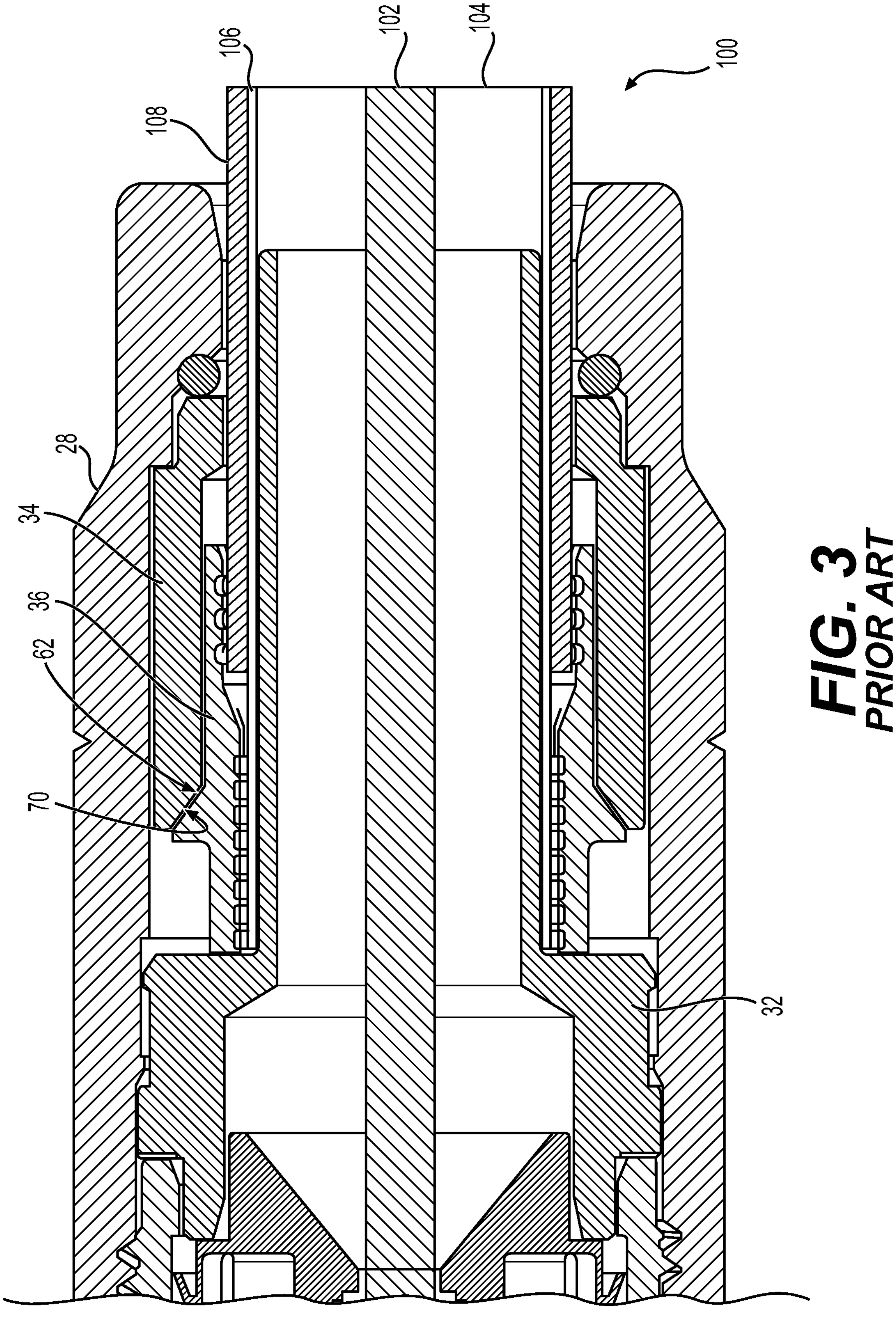
FIG. 3 PRIOR ART
FIG. 3 is an enlarged side cross-sectional view of the connector of FIG. 1.
Figure 4:
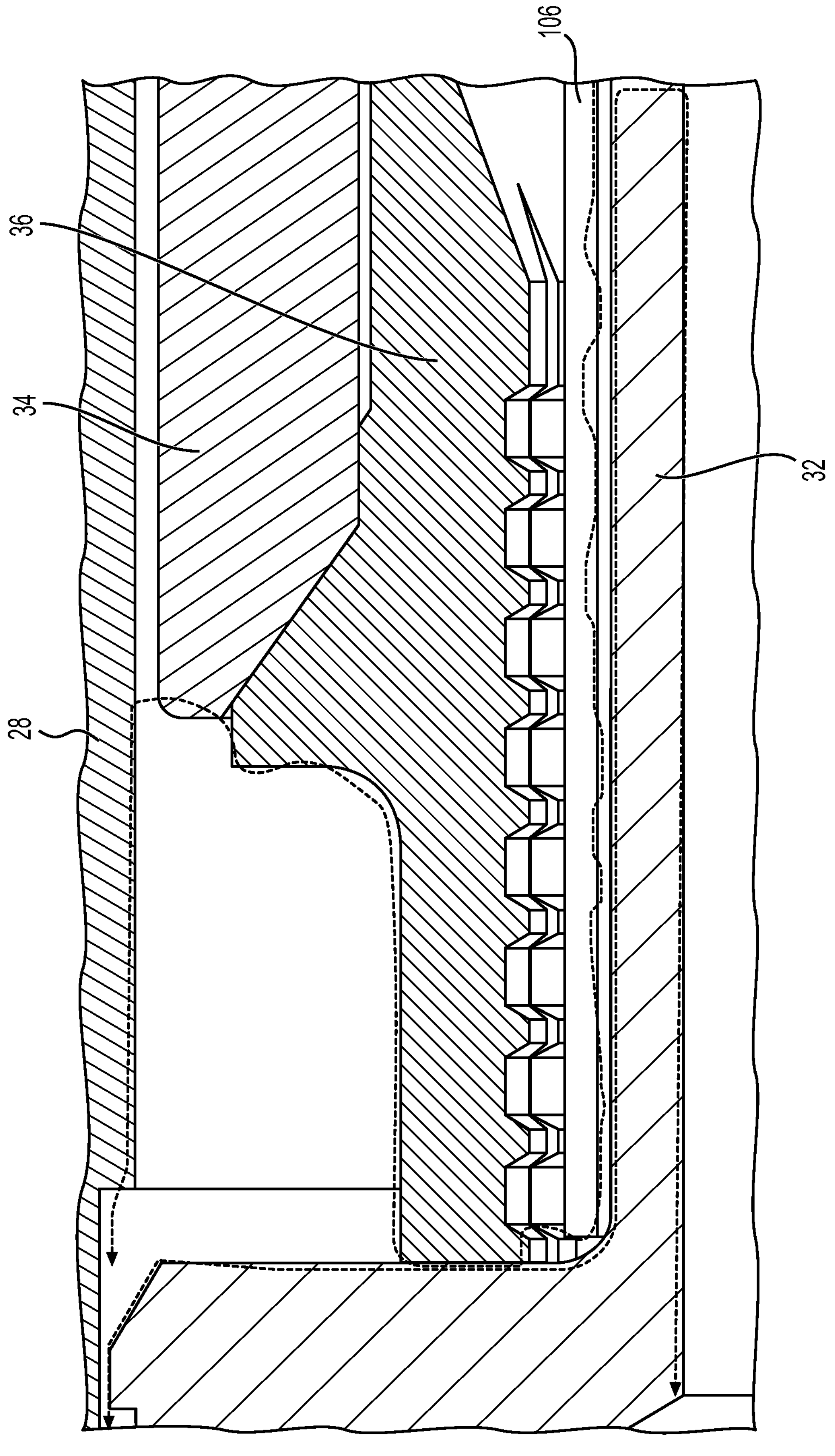
FIG. 4 PRIOR ART
FIG. 4 is a further enlarged side cross-sectional view of the connector of FIG. 1.

As also shown in FIGS. 3 and 4, a coaxial cable 100 is inserted into the rearward end of the back nut assembly 14 of the connector 10. Coaxial cables 100 generally include a solid center conductor 102 typically formed from a conductive metal, such as copper, copper clad aluminum, copper clad steel, or the like capable of conducting electrical signals therethrough. Surrounding the cable center conductor 102 is a cable dielectric 104, which insulates the cable center conductor to minimize signal loss. The cable dielectric 104 also maintains a spacing between the cable center conductor 102 and a cable outer conductor or shield 106. The cable dielectric 104 is often a plastic material, such as a polyethylene, a fluorinated plastic material, such as a polyethylene or a polytetrafluoroethylene, a fiberglass braid, or the like. The cable shield or outer conductor 106 is typically made of metal, such as aluminum or copper, and is often extruded to form a hollow tubular structure with a solid wall having a smooth exterior surface. An insulative cable jacket (not shown) may surround the cable outer conductor 106 to further seal the coaxial cable 100. The cable jacket is typically made of plastic, such as polyvinylchloride, polyethylene, polyurethane, or polytetrafluoroethylene.

The connector 10 includes a plurality of components generally having a coaxial configuration about an axis defined by the center conductor 102 of the coaxial cable 100. The front nut assembly 12 includes an entry body housing 16 supporting a terminal assembly 18 therein. Specifically, the entry body housing 16 is formed with an axial bore configured to cooperatively contain the terminal assembly 18 and is made from an electrically conductive material such as aluminum, brass or the like. The entry body housing 16 is formed with a threaded portion 20 at its forward end and a rearward threaded portion 22 opposite the forward threaded portion. The forward threaded portion 20 is configured to cooperate with devices located in the field that receive the forward end of the pin assembly 18. An O-ring 24 may be provided around the forward threaded portion 30 to improve the seal that is made with a device and a portion of the exterior perimeter of the entry body housing 16 may be provided with a hexagonal shape to accommodate the use of tools during installation.

The rearward threaded portion 22 of the front nut assembly 12 is configured to cooperate with the back nut assembly 14. Specifically, the rearward threaded portion 22 includes a rim face 26 that cooperates with an insert shaft 32 of the back nut assembly 14, as will be described in further detail below.

The back nut assembly 14 of the connector 10 includes a nut housing 28 having an axial bore and a compression subassembly 30 rotatably supported within the axial bore. The compression subassembly 30 generally includes the insert shaft 32, a holder sleeve 34, a cable gripping ferrule 36, and an O-ring 42 arranged in a coaxial relationship about the central axis of the back nut housing 28. The cable jacket O-ring 42 improves the seal between the nut housing 28 and the cable 100 upon assembly.

The back nut housing 28 is made from an electrically conductive material, such as aluminum, brass, or the like, and includes a forward internally threaded portion 44 that cooperates with the rearward threaded portion 22 of the entry body housing 16 so that the two connector portions may be threadedly coupled together. The exterior surface of the back nut housing 28 is preferably provided with a hexagonal shape to accommodate the use of tools to facilitate such threaded coupling.

At its rearward end, the back nut housing 28 is formed with an axial bore 46 dimensioned to receive the outside diameter of the cable 100 in snug fitting relationship. At its forward end, opposite the rearward end, the back nut housing 28 is formed with a forward axial bore 47 communicating with the rearward axial bore 46 and dimensioned to accommodate the outer diameter of the insert shaft 32. The back nut housing 28 is also preferably formed with an internal annular shoulder 48 that prevents rearward movement of the holder sleeve 34, and thus the gripping ferrule 36, as the gripping ferrule is radially compressed, as will be discussed in further detail below.

The insert shaft 32 includes a tubular body 52 terminating at a forward flanged head portion 54. The insert shaft 32 is made from metal. The outside diameter of the tubular body 52 of the insert shaft 32 is dimensioned to be fitted within the inner diameter of the outer conductor 106 of the coaxial cable 100. Also, the inside diameter of the tubular body 52 is dimensioned to provide a passageway to receive the center conductor 102 of the cable 100 after the cable has been prepared for termination, wherein a length of the dielectric 104 has been removed from the forward end of the cable.

The holder sleeve 34 is preferably made from an electrically conductive material, such as aluminum or brass, and includes a sleeve body 58 having an exterior surface configured to be received within the forward axial bore 47 of the back nut housing 28. The sleeve body 58 terminates at a rearward edge 60, which engages the annular shoulder 48 of the back nut housing 28.

The cable gripping ferrule 36 is generally in the form of a split tube having an axial gap 66 extending the full length of the ferrule. The gap 66 permits the diameter of the ferrule 36 to be reduced more easily so that the ferrule can be uniformly, radially compressed around the insert shaft 32 upon rearward axial movement of the insert shaft 32, as will be discussed in further detail below. The inner surface 68 of the gripping ferrule is preferably provided with structure to enhance gripping of the outer surface of the cable. Such structure may include internal threads, teeth or some other form of textured surface.

As mentioned above, the outer surface of the cable gripping ferrule 36 is provided with a circumferential ramped portion 62, which engages a forward end 70 of the holder sleeve 34, opposite the rearward edge 60, upon rearward axial movement of the insert shaft 32 to radially compress the gripping ferrule 36. The ramped portion 62 defines a conical segment of the cable gripping ferrule 36 that tapers radially inwardly in the rearward direction. A rearward portion of the gripping ferrule 36 is received in an axial bore of the holder sleeve 34.

Operation and installation of the connector 10 will now be described. Initially, the end of the coaxial cable 100 that is to be inserted into the rearward end of the back nut housing 28 is prepared in a conventional manner. In particular, cable preparation entails removing about 0.75 inch (19.05 mm) of cable dielectric 104, outer cable conductor 106 and cable jacket to expose a portion of the center conductor 102 that will engage the pin-terminal assembly 18 of the front nut assembly 12. In addition, about 1.25 inches (31.75 mm) of the cable dielectric 104 is removed from within the outer cable conductor 106 to provide clearance for the installation of the insert shaft 32, and about 0.5 inch (12.70 mm) of cable jacket is removed to make an electrical connection with the inside surface 68 of the cable gripping ferrule 36. After the cable end is prepared, it is inserted into the back nut housing 28 so that the portion of the center conductor 102 engages the pin-terminal assembly 18.

The back nut housing 28 is next threadedly coupled and rotated with respect to the front nut housing 16 to translate the front nut and back nut assemblies 12, 14 together along their central axes. As the front nut and back nut assemblies 12, 14 are translated closer together, the rim face 26 of the front nut housing 16 engages a forward shoulder 64 of the insert shaft 32 to translate the insert shaft 32 towards the rear of the back nut housing 28. The interlocking mating surfaces of the front nut and back nut assemblies 12, 14 cooperate to limit the amount of rotation between the front nut housing 16 and the back nut housing 28.

The rearward translation of the insert shaft 32 causes the outer ramp portion 62 of the gripping ferrule 36 to engage the forward end 70 of the holder sleeve 34, resulting in a radial compression of the ferrule 36. The radial compression of the ferrule 36 reduces the overall diameter of the ferrule 36 and reduces the axial gap 66 of the ferrule so that the inner threaded surface 68 of the ferrule 36 bites down on the exposed portion of the outer cable conductor 106 and presses the conductor against the insert shaft 32.

Figure 5:
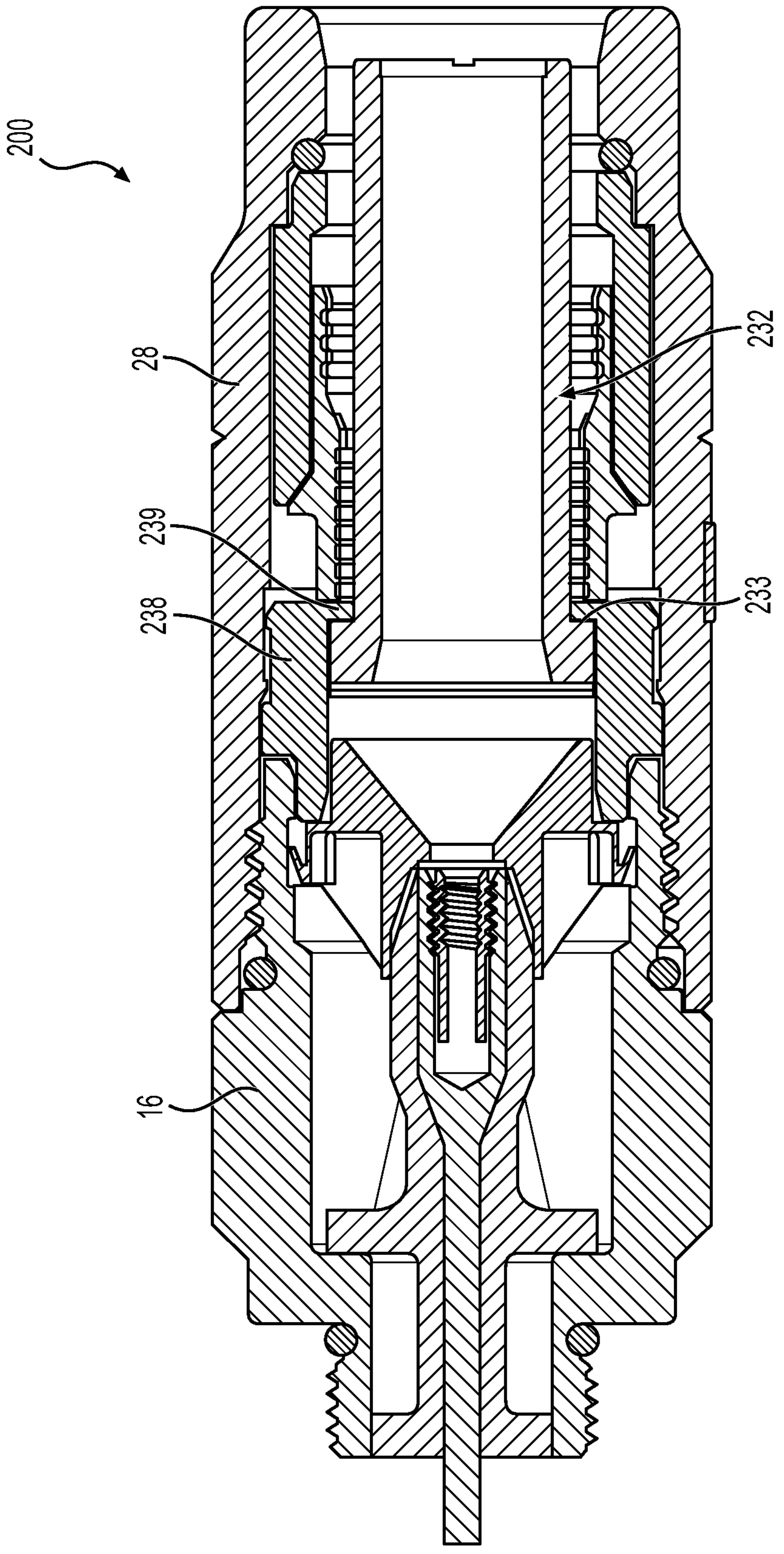
FIG. 5 PRIOR ART
FIG. 5 is a side cross-sectional view of another conventional hardline connector.

Referring now to FIG. 5, another conventional hardline connector 200 is illustrated. The connector 200 is similar to the conventional connector 10 described above, except that the metal insert shaft 32 is replaced with a forward holder sleeve 238 constructed of metal and a plastic insert shaft 232. The forward holder sleeve 238 includes a radially inward lip 239 that engages a rearward facing shoulder 233 of the insert shaft 232 to limit rearward axial movement of the insert shaft 232 relative to the back nut housing 28 during assembly of the front nut and back nut housings 16, 28.

Figure 6:
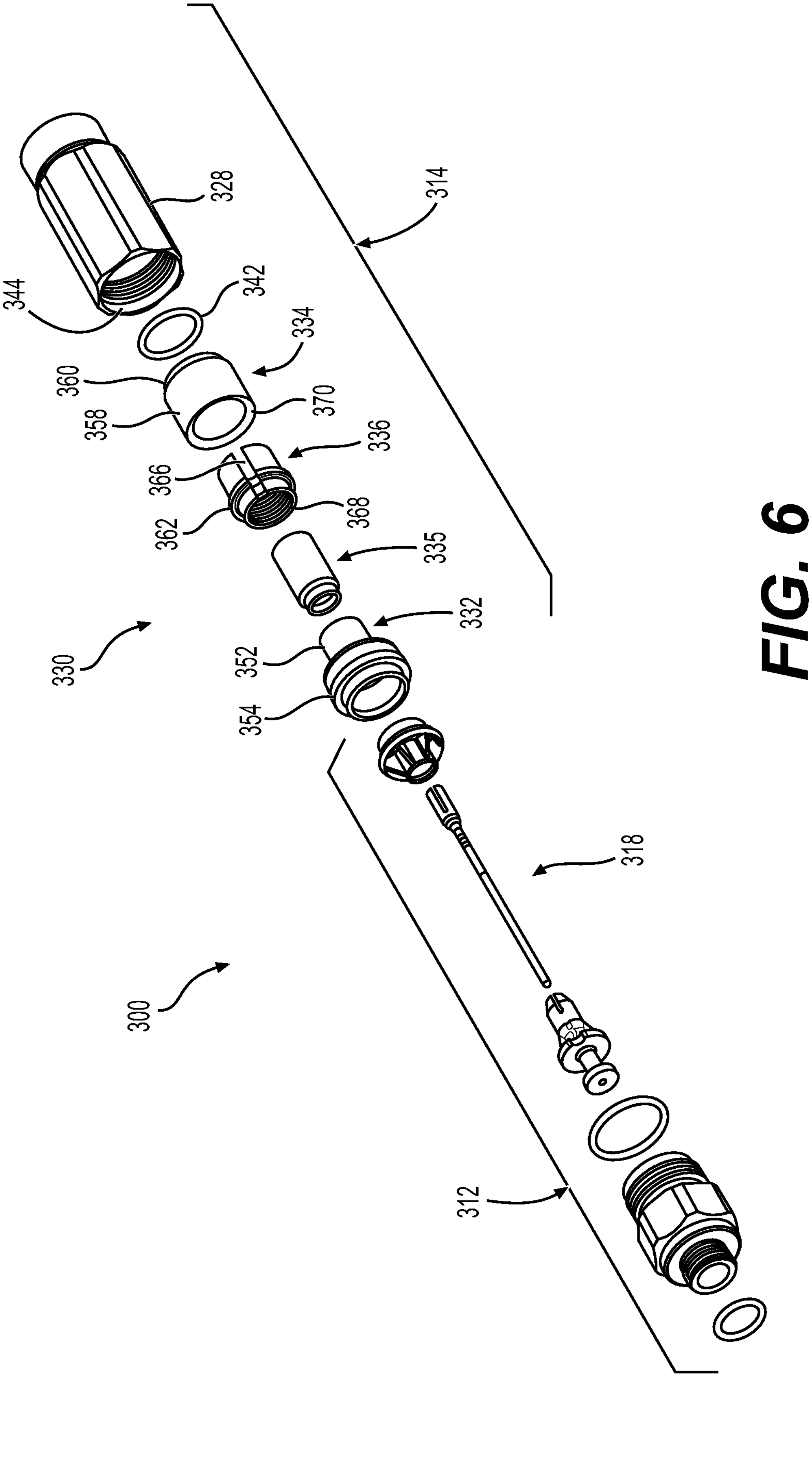
FIG. 6 is an exploded perspective view of an exemplary hardline connector in accordance with various aspects of the disclosure.
Figure 7:
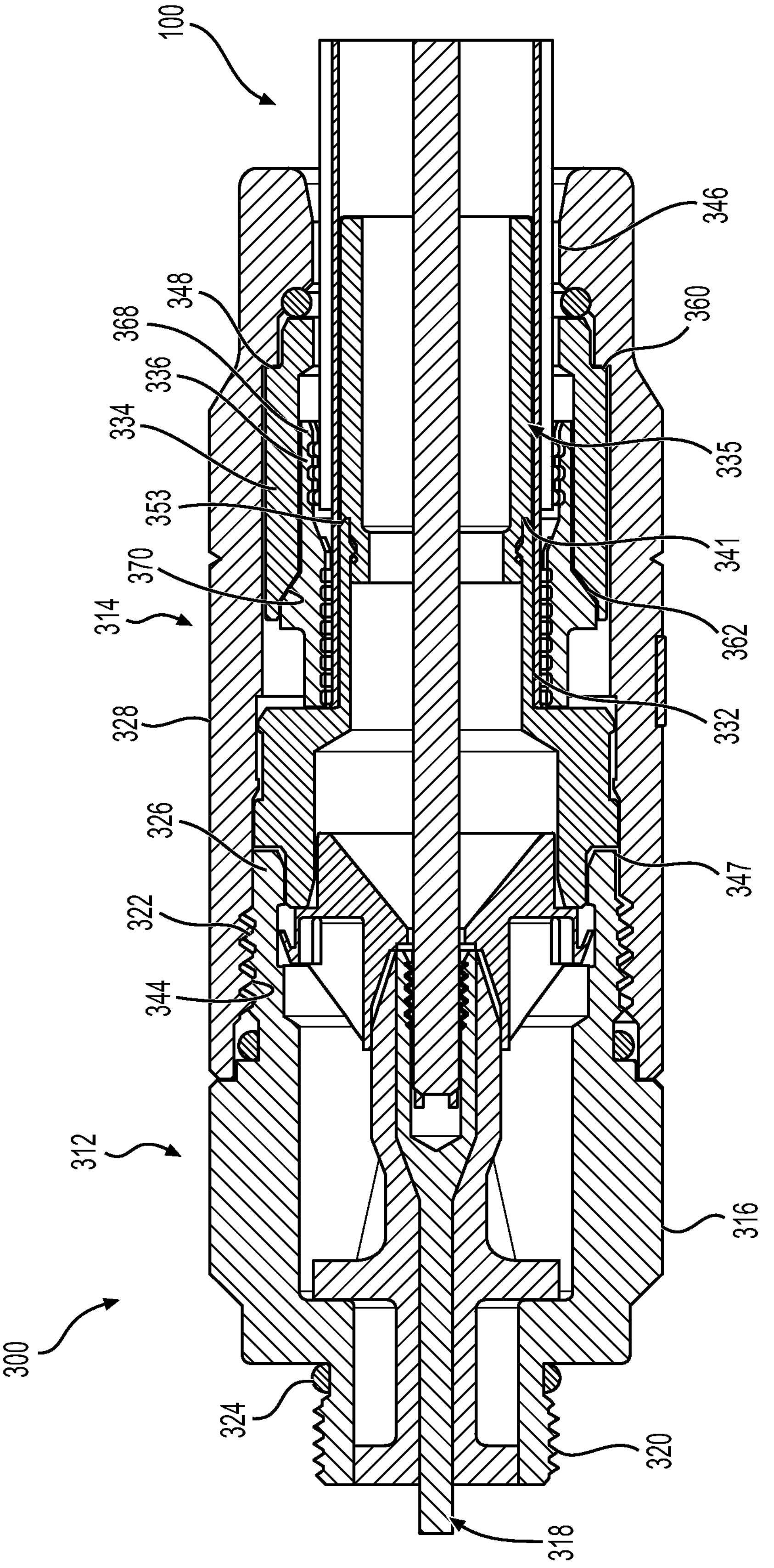
FIG. 7 is a side cross-sectional view of the connector of FIG. 6.
Figure 8:
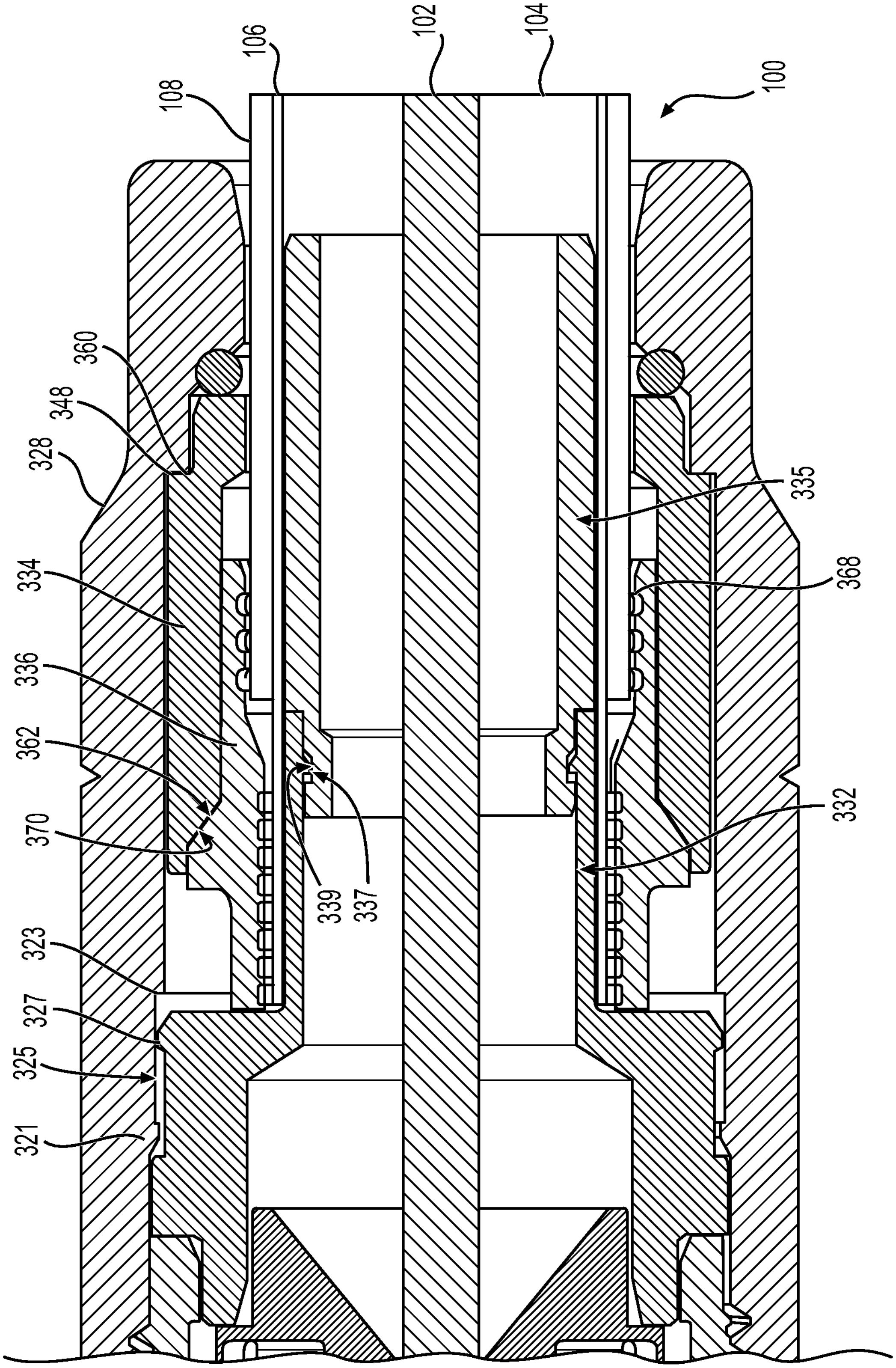
FIG. 8 is an enlarged side cross-sectional view of the connector of FIG. 6.

Referring now to FIGS. 6-8, an exemplary hardline connector 300 in accordance with various aspects of the disclosure is illustrated. The connector 300 includes a front nut assembly 312 and a back nut assembly 314 that are configured to be removably connected to one another while providing both an electrical and mechanical connection therebetween. As also shown in FIGS. 7 and 8, a coaxial cable 100 is inserted into the rearward end of the back nut assembly 314 of the connector 300.

The connector 300 includes a plurality of components generally having a coaxial configuration about an axis defined by the center conductor 102 of the coaxial cable 100. The front nut assembly 312 includes an entry body housing 316 supporting a terminal pin assembly 318 therein. Specifically, the entry body housing 316 is formed with an axial bore configured to cooperatively contain the terminal pin assembly 318 and is made from an electrically conductive material such as aluminum, brass or the like. The entry body housing 316 is formed with a threaded portion 320 at its forward end and a rearward threaded portion 322 opposite the forward threaded portion. The forward threaded portion 320 is configured to cooperate with devices located in the field that receive the forward end of the pin assembly 318. An O-ring 324 may be provided around the forward threaded portion 320 to improve the seal that is made with a device and a portion of the exterior perimeter of the entry body housing 316 may be provided with a hexagonal shape to accommodate the use of tools during installation.

The rearward threaded portion 322 of the front nut assembly 312 is configured to cooperate with the back nut assembly 314. Specifically, the rearward threaded portion 322 includes a rim face 326 that cooperates with a conductive insert shaft 332 of the back nut assembly 314, as will be described in further detail below.

The back nut assembly 314 of the connector 300 includes a back nut housing 328 having an axial bore and a compression subassembly 330 rotatably supported within the axial bore. The compression subassembly 330 generally includes the conductive insert shaft 332, a holder sleeve 334, a nonconductive support sleeve 335, a cable gripping ferrule 336, and an O-ring 342 arranged in a coaxial relationship about the central axis of the back nut housing 328. The cable jacket O-ring 342 improves the seal between the nut housing 328 and the cable 100 upon assembly.

The back nut housing 328 is made from an electrically conductive material, such as aluminum, brass, or the like, and includes a forward internally threaded portion 344 that cooperates with the rearward threaded portion 322 of the entry body housing 316 so that the two connector portions may be threadedly coupled together. The exterior surface of the back nut housing 328 is preferably provided with a hexagonal shape to accommodate the use of tools to facilitate such threaded coupling.

At its rearward end, the back nut housing 328 is formed with an axial bore 346 dimensioned to receive the outside diameter of the cable 100 in snug fitting relationship. At its forward end, opposite the rearward end, the back nut housing 328 is formed with a forward axial bore 347 communicating with the rearward axial bore 346 and dimensioned to accommodate the outer diameter of the insert shaft 332. For example, the internal surface of the back nut housing 328 may include an annular lip 321 and an annular shoulder 323 that define an annular groove 325 having an axial dimension. The annular groove 325 receives an annular projection 327 extending radially outward from an outer surface of the insert shaft 332 and permits axial movement of the insert shaft 332 relative to the back nut housing 328 within the axial dimension of the annular groove 325. The back nut housing 328 is also preferably formed with an internal annular shoulder 348 that prevents rearward movement of the holder sleeve 334, and thus the gripping ferrule 336, as the gripping ferrule is radially compressed, as will be discussed in further detail below.

The insert shaft 332 includes a tubular body 352 terminating at a forward flanged head portion 354. The insert shaft 332 is made from metal. The outside diameter of the tubular body 352 of the insert shaft 332 is dimensioned to be fitted within the inner diameter of the outer conductor 106 of the coaxial cable 100. Also, the inside diameter of the tubular body 352 is dimensioned to provide a passageway to receive the center conductor 102 of the cable 100 after the cable has been prepared for termination, wherein a length of the dielectric 104 has been removed from the forward end of the cable.

The support sleeve 335 is a tubular body made from plastic. The outside diameter of the tubular body of the support sleeve 335 is dimensioned to be fitted within the inner diameter of the outer conductor 106 of the coaxial cable 100. Also, the inside diameter of the tubular body of the support sleeve 335 is dimensioned to provide a passageway to receive the center conductor 102 of the cable 100 after the cable has been prepared for termination, wherein a length of the dielectric 104 has been removed from the forward end of the cable. A forward region of the support sleeve 335 includes a retention structure 337 configured to receive a complementary retention structure 339 at a rearward region of the insert shaft 332. For example, as illustrated, the retention structure 337 may be an annular groove, and the retention structure 339 may be an annular projection. The retention structures 337, 339 cooperate to limit or prevent relative axial movement between the insert shaft 332 and the support sleeve 335. The support sleeve 335 may also include a forward facing annular shoulder 341 that can engage a rearward edge 342 of the insert shaft 332. The plastic support sleeve 335 may have a thicker radial wall than the metal insert shaft 332. The metal insert shaft 332 has an axial length that extends into the gripping ferrule 336, but does not extend to the rearward axial bore 346. The plastic support sleeve 335 has an axial length that extends from the metal insert shaft within the gripping ferrule 336 to the rearward axial bore 346.

The holder sleeve 334 is preferably made from an electrically conductive material, such as aluminum or brass, and includes a sleeve body 358 having an exterior surface configured to be received within the forward axial bore 347 of the back nut housing 328. The sleeve body 358 terminates at a rearward edge 360, which engages the annular shoulder 348 of the back nut housing 328.

The cable gripping ferrule 336 is generally in the form of a split tube having an axial gap 366 extending the full length of the ferrule. The gap 366 permits the diameter of the ferrule 336 to be reduced more easily so that the ferrule can be uniformly, radially compressed around the insert shaft 332 and the support sleeve 335 upon rearward axial movement of the insert shaft 332, as will be discussed in further detail below. The inner surface 368 of the gripping ferrule is preferably provided with structure to enhance gripping of the outer surface of the cable. Such structure may include internal threads, teeth or some other form of textured surface.

As mentioned above, the outer surface of the cable gripping ferrule 336 is provided with a circumferential ramped portion 362, which engages a forward end 370 of the holder sleeve 334, opposite the rearward edge 360, upon rearward axial movement of the insert shaft 332 and the support shaft 335 to radially compress the gripping ferrule 336. The ramped portion 362 defines a conical segment of the cable gripping ferrule 336 that tapers radially inwardly in the rearward direction. A rearward portion of the gripping ferrule 336 is received in an axial bore of the holder sleeve 334.

Operation and installation of the connector 300 will now be described. Initially, the end of the coaxial cable 100 that is to be inserted into the rearward end of the back nut housing 328 is prepared in a conventional manner. In particular, cable preparation entails removing about 0.75 inch (19.05 mm) of cable dielectric 104, outer cable conductor 106 and cable jacket to expose a portion of the center conductor 102 that will engage the pin-terminal assembly 318 of the front nut assembly 312. In addition, about 1.25 inches (31.75 mm) of the cable dielectric 104 is removed from within the outer cable conductor 106 to provide clearance for the installation of the insert shaft 332 and the support sleeve 335, and about 0.5 inch (12.70 mm) of cable jacket is removed to make an electrical connection with the inside surface 368 of the cable gripping ferrule 336. After the cable end is prepared, it is inserted into the back nut housing 328 so that the portion of the center conductor 102 engages the pin-terminal assembly 318.

The back nut housing 328 is next threadedly coupled and rotated with respect to the front nut housing 316 to translate the front nut and back nut assemblies 312, 314 together along their central axes. As the front nut and back nut assemblies 312, 314 are translated closer together, the rim face 326 of the front nut housing 316 engages a forward shoulder 364 of the insert shaft 332 to translate the insert shaft 332 and the support sleeve 335 towards the rear of the back nut housing 328. The interlocking mating surfaces of the front nut and back nut assemblies 312, 314 cooperate to limit the amount of rotation between the front nut housing 316 and the back nut housing 328.

The rearward translation of the insert shaft 332 and support sleeve 335 causes the outer ramp portion 362 of the gripping ferrule 336 to engage the forward end 370 of the holder sleeve 334, resulting in a radial compression of the ferrule 336. The radial compression of the ferrule 336 reduces the overall diameter of the ferrule 336 and reduces the axial gap 366 of the ferrule so that the inner threaded surface 368 of the ferrule 336 bites down on the exposed portion of the outer cable conductor 106 and presses the conductor against the insert shaft 332 and the support sleeve 335.

Figure 9:
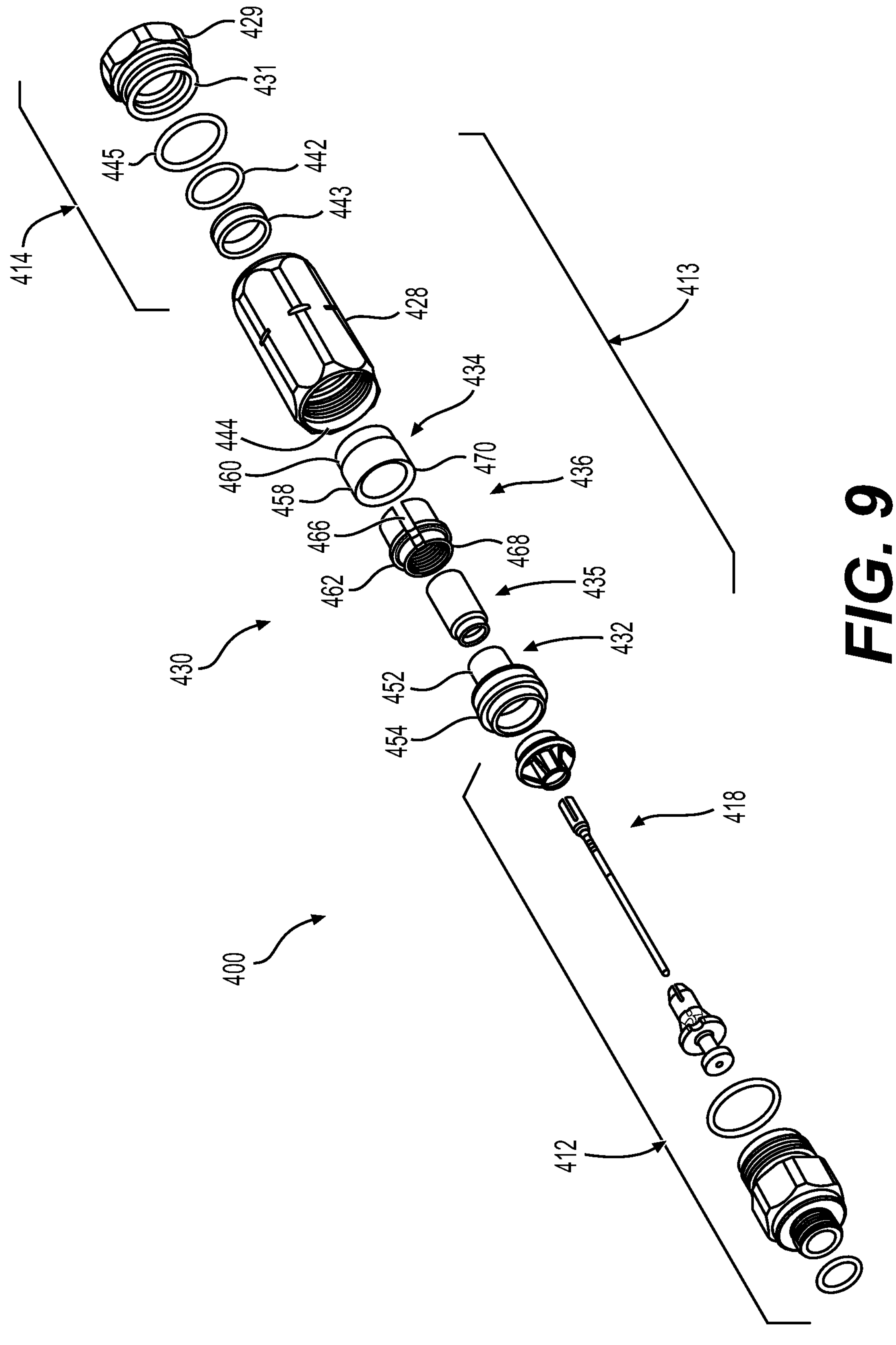
FIG. 9 is an exploded perspective view of another exemplary hardline connector in accordance with various aspects of the disclosure.
Figure 10:
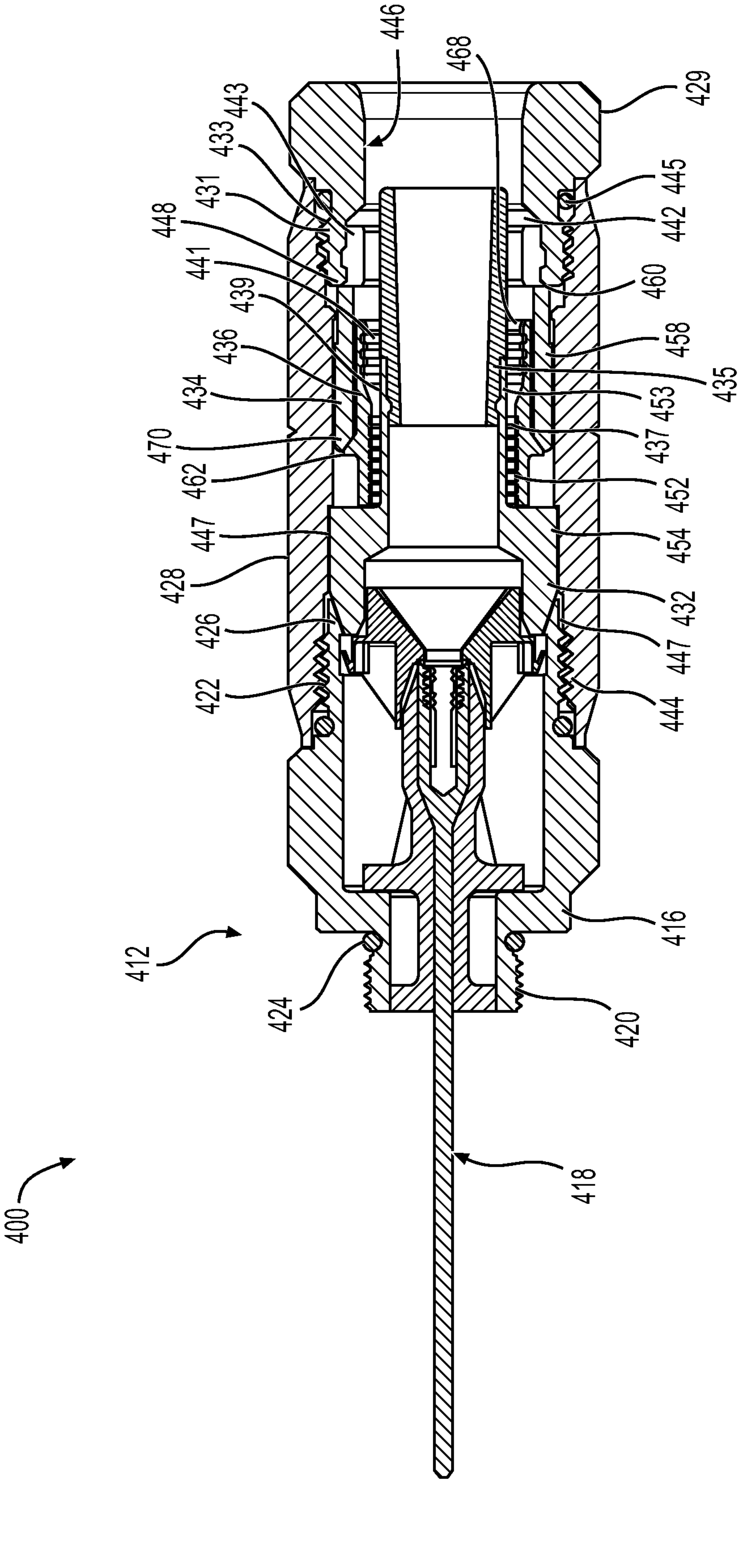
FIG. 10 is a side cross-sectional view of the connector of FIG. 9.

Referring now to FIGS. 9 and 10, another exemplary hardline connector 400 in accordance with various aspects of the disclosure is illustrated. The connector 400 includes a front nut assembly 412, a mid nut assembly 413, and a back nut assembly 414 that are configured to be removably connected to one another while providing both an electrical and mechanical connection therebetween. Although not illustrated, the connector 400 is configured such that a coaxial cable 100 can be inserted into the rearward end of the back nut assembly 414 of the connector 400.

The connector 400 includes a plurality of components generally having a coaxial configuration about an axis defined by the center conductor 102 of the coaxial cable 100. The front nut assembly 412 includes an entry body housing 416 supporting a terminal pin assembly 418 therein. Specifically, the entry body housing 416 is formed with an axial bore configured to cooperatively contain the terminal pin assembly 418 and is made from an electrically conductive material such as aluminum, brass or the like. The entry body housing 416 is formed with a threaded portion 420 at its forward end and a rearward threaded portion 422 opposite the forward threaded portion. The forward threaded portion 420 is configured to cooperate with devices located in the field that receive the forward end of the pin assembly 418. An O-ring 424 may be provided around the forward threaded portion 420 to improve the seal that is made with a device and a portion of the exterior perimeter of the entry body housing 416 may be provided with a hexagonal shape to accommodate the use of tools during installation.

The rearward threaded portion 422 of the front nut assembly 412 is configured to cooperate with the mid nut assembly 413. Specifically, the rearward threaded portion 422 includes a rim face 426 that engages an insert shaft 432 of the mid nut assembly 413.

The mid nut assembly 413 of the connector 400 includes a nut housing 428 having an axial bore and a compression subassembly 430 rotatably supported within the axial bore. The compression subassembly 430 generally includes the insert shaft 432, a holder sleeve 434, a support sleeve 435, and a cable gripping ferrule 436.

The back nut assembly 414 of the connector 400 includes an end cap 429, an insert sleeve 443, a first O-ring 442, and a second O-ring 445 arranged in a coaxial relationship about the central axis of the mid nut housing 428. The first O-ring 442 improves the seal between the end cap 429 and the cable 100 upon assembly, and the second O-ring 445 improves the seal between the end cap 429 and the mid nut housing 428.

The mid nut housing 428 is made from an electrically conductive material, such as aluminum, brass, or the like, and includes a forward internally threaded portion 444 that cooperates with the rearward threaded portion 422 of the entry body housing 416 so that the two connector portions may be threadedly coupled together. Similarly, the end cap 429 may be made from an electrically conductive material, such as aluminum, brass, or the like, and includes a forward internally threaded portion 431 that cooperates with a rearward threaded portion 433 of the mid nut housing 428 so that the two connector portions may be threadedly coupled together. The exterior surface of the mid nut housing 428 and/or the end cap 429 are preferably provided with a hexagonal shape to accommodate the use of tools to facilitate such threaded coupling.

The end cap 429 and the insert sleeve 443 are formed with an axial bore 446 dimensioned to receive the outside diameter of the cable 100 in snug fitting relationship. At a forward end of the mid nut housing 428, opposite the end cap 429, the mid nut housing 428 is formed with a forward axial bore 447 communicating with the rearward axial bore 446 and dimensioned to accommodate the outer diameter of the insert shaft 432. The end cap 429 is preferably formed with an internal annular shoulder 448 that prevents rearward movement of the holder sleeve 434, and thus the gripping ferrule 436, as the gripping ferrule is radially compressed, as will be discussed in further detail below.

The insert shaft 432 includes a tubular body 452 terminating at a forward flanged head portion 454. The insert shaft 432 is made from metal. The outside diameter of the tubular body 452 of the insert shaft 432 is dimensioned to be fitted within the inner diameter of the outer conductor 106 of the coaxial cable 100. Also, the inside diameter of the tubular body 452 is dimensioned to provide a passageway to receive the center conductor 102 of the cable 100 after the cable has been prepared for termination, wherein a length of the dielectric 104 has been removed from the forward end of the cable.

The support sleeve 435 is a tubular body made from plastic. The outside diameter of the tubular body of the support sleeve 435 is dimensioned to be fitted within the inner diameter of the outer conductor 106 of the coaxial cable 100. Also, the inside diameter of the tubular body of the support sleeve 435 is dimensioned to provide a passageway to receive the center conductor 102 of the cable 100 after the cable has been prepared for termination, wherein a length of the dielectric 104 has been removed from the forward end of the cable. In some aspects, the inside diameter of the tubular body of the support sleeve 435 may taper from the rear end toward the forward end, as shown in FIG. 10.

A forward region of the support sleeve 435 includes a retention structure 437 configured to receive a complementary retention structure 439 at a rearward region of the insert shaft 432. For example, as illustrated, the retention structure 437 may be an annular groove, and the retention structure 439 may be an annular projection. The retention structures 437, 439 cooperate to limit or prevent relative axial movement between the insert shaft 432 and the support sleeve 435. The support sleeve 435 may also include a forward facing annular shoulder 441 that can engage a rearward edge 453 of the insert shaft 432. The plastic support sleeve 435 may have a thicker radial wall than the metal insert shaft 432. The metal insert shaft 432 has an axial length that extends into the gripping ferrule 436, but does not extend to the rearward axial bore 446. The plastic support sleeve 435 has an axial length that extends from the metal insert shaft 432 within the gripping ferrule 436 to the rearward axial bore 446.

The holder sleeve 434 is preferably made from an electrically conductive material, such as aluminum or brass, and includes a sleeve body 458 having an exterior surface configured to be received within the forward axial bore 447 of the mid nut housing 428. The sleeve body 458 terminates at a rearward edge 460, which engages the annular shoulder 448 of the end cap 429 and a forward end of the insert sleeve 443.

The cable gripping ferrule 436 is generally in the form of a split tube having an axial gap 466 extending the full length of the ferrule. The gap 466 permits the diameter of the ferrule 436 to be reduced more easily so that the ferrule can be uniformly, radially compressed around the insert shaft 432 and the support sleeve 435 upon rearward axial movement of the insert shaft 432. The inner surface 468 of the gripping ferrule is preferably provided with structure to enhance gripping of the outer surface of the cable. Such structure may include internal threads, teeth or some other form of textured surface.

As mentioned above, the outer surface of the cable gripping ferrule 436 is provided with a circumferential ramped portion 462, which engages a forward end 470 of the holder sleeve 434, opposite the rearward edge 460, upon forward axial movement of the holder sleeve 434 to radially compress the gripping ferrule 436. The ramped portion 462 defines a conical segment of the cable gripping ferrule 436 that tapers radially inwardly in the rearward direction. A rearward portion of the gripping ferrule 436 is received in an axial bore of the holder sleeve 434.

Operation and installation of the connector 400 will now be described. Initially, the end of the coaxial cable 100 that is to be inserted through the back nut assembly 414 and into the rearward end of the mid nut housing 428 is prepared in a conventional manner. The mid nut housing 428 is threadedly coupled and rotated with respect to the front nut housing 416 and the end cap 429 is threadedly coupled and rotated with respect to the mid nut housing 428 to translate the front nut and mid nut assemblies 412, 413 together along their central axes. As the front nut and mid nut assemblies 412, 413 are translated closer together, the internal annular shoulder 448 engages the holder sleeve 434 to translate the holder sleeve 434 in a forward axial direction relative to the gripping ferrule 436. The interlocking mating surfaces of the front nut, mid nut, and back nut assemblies 412, 413, 414 cooperate to limit the amount of rotation between the front nut housing 416, the mid nut housing 428, and the end cap 429.

The forward translation of the holder sleeve 424 causes the forward end 470 of the holder sleeve 434 to engage the outer ramp portion 462 of the gripping ferrule 436, resulting in a radial compression of the ferrule 436. The radial compression of the ferrule 436 reduces the overall diameter of the ferrule 436 and reduces the axial gap 466 of the ferrule so that the inner threaded surface 468 of the ferrule 436 bites down on the exposed portion of the outer cable conductor 106 and presses the conductor against the insert shaft 432 and the support sleeve 435.

Figure 11:
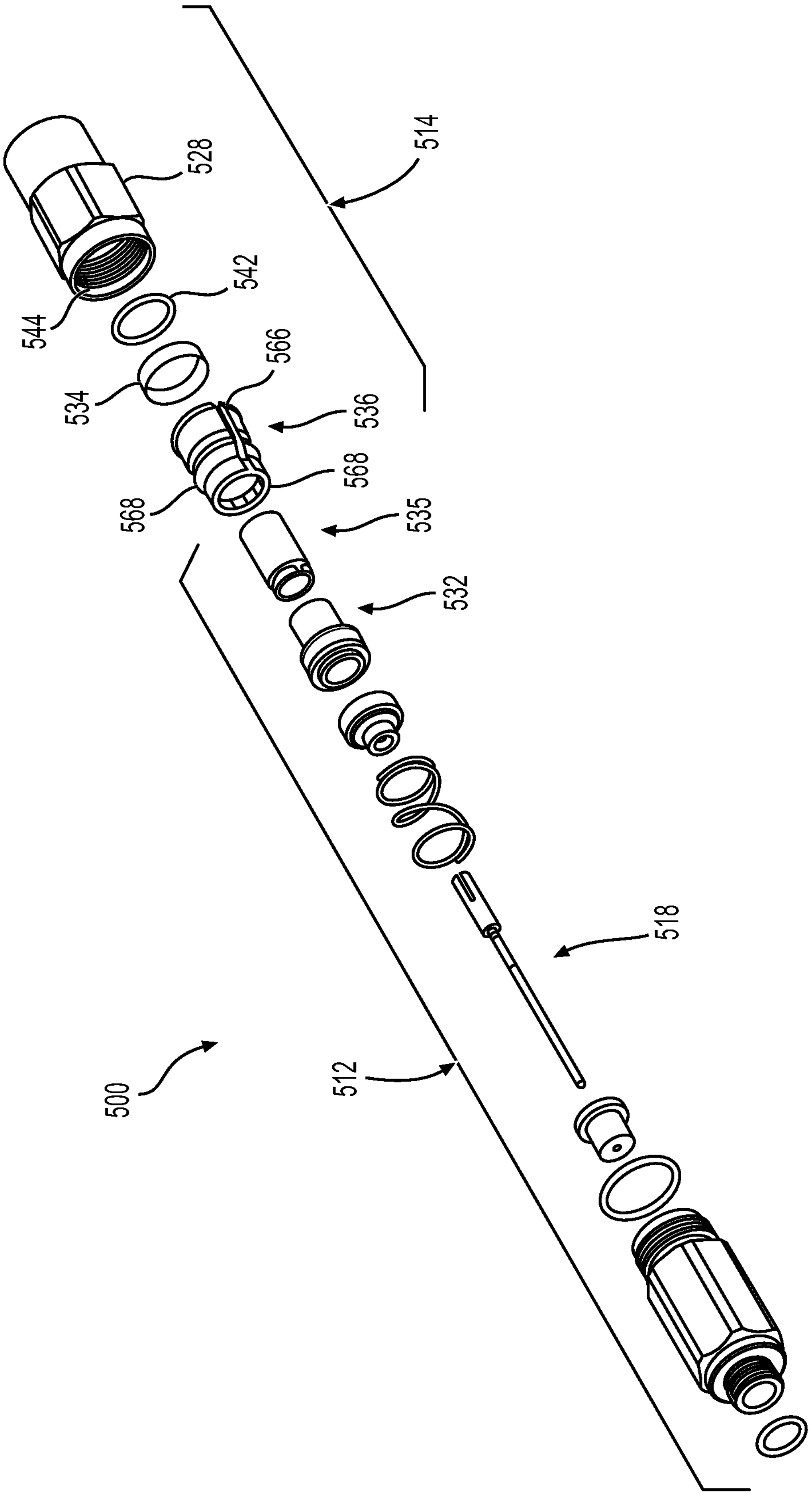
FIG. 11 is an exploded perspective view of yet another exemplary hardline connector in accordance with various aspects of the disclosure.
Figure 12:
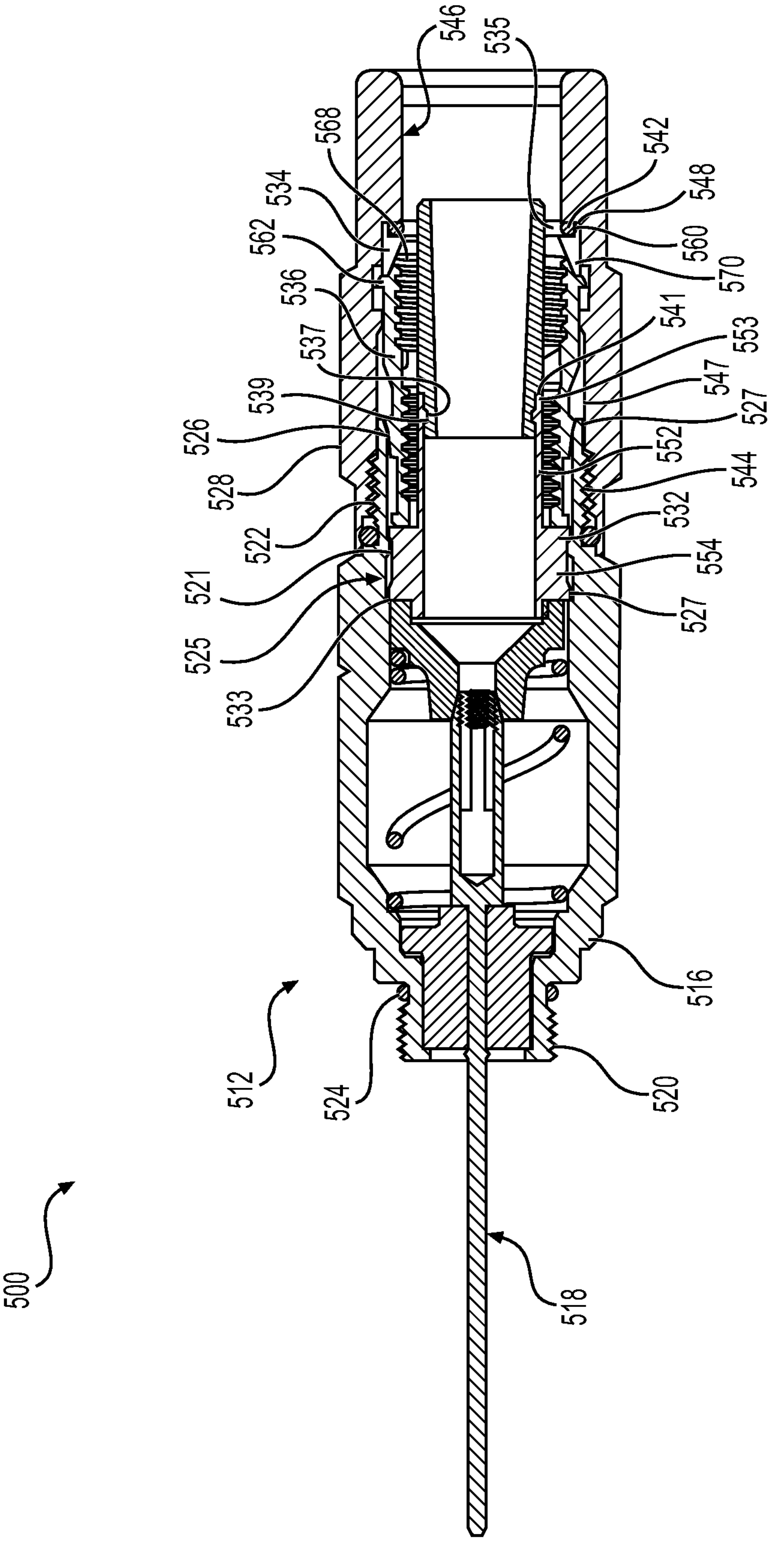
FIG. 12 is a side cross-sectional view of the connector of FIG. 11.

Referring now to FIGS. 11 and 12, an exemplary hardline connector 500 in accordance with various aspects of the disclosure is illustrated. The connector 500 includes a front nut assembly 512 and a back nut assembly 514 that are configured to be removably connected to one another while providing both an electrical and mechanical connection therebetween. Although not illustrated, the connector 500 is configured such that a coaxial cable 100 can be inserted into the rearward end of the back nut assembly 514 of the connector 500.

The connector 500 includes a plurality of components generally having a coaxial configuration about an axis defined by the center conductor 102 of the coaxial cable 100. The front nut assembly 512 includes an entry body housing 516 supporting a terminal pin assembly 518 therein. Specifically, the entry body housing 516 is formed with an axial bore configured to cooperatively contain the terminal pin assembly 518 and is made from an electrically conductive material such as aluminum, brass or the like. The entry body housing 516 is formed with a threaded portion 520 at its forward end and a rearward threaded portion 522 opposite the forward threaded portion 520. The forward threaded portion 520 is configured to cooperate with devices located in the field that receive the forward end of the pin assembly 518. An O-ring 524 may be provided around the forward threaded portion 520 to improve the seal that is made with a device and a portion of the exterior perimeter of the entry body housing 516 may be provided with a hexagonal shape to accommodate the use of tools during installation.

The rearward threaded portion 522 of the front nut assembly 512 is configured to cooperate with the back nut assembly 514. Specifically, the rearward threaded portion 522 includes a rim face 526 and ramped surface 527 that cooperates with a ramped surface of the gripping ferrule 536, as will be described in further detail below.

The back nut assembly 514 of the connector 500 includes a nut housing 528 having an axial bore and a compression subassembly 530 rotatably supported within the axial bore. The compression subassembly 530 generally includes a holder sleeve 534, a cable gripping ferrule 536, and an O-ring 542 arranged in a coaxial relationship about the central axis of the back nut housing 528. The cable jacket O-ring 542 improves the seal between the nut housing 528 and the cable 100 upon assembly.

The back nut housing 528 is made from an electrically conductive material, such as aluminum, brass, or the like, and includes a forward internally threaded portion 544 that cooperates with the rearward threaded portion 522 of the entry body housing 516 so that the two connector portions may be threadedly coupled together. The exterior surface of the back nut housing 528 is preferably provided with a hexagonal shape to accommodate the use of tools to facilitate such threaded coupling.

At its rearward end, the back nut housing 528 is formed with an axial bore 546 dimensioned to receive the outside diameter of the cable 100 in snug fitting relationship. The back nut housing 528 is also preferably formed with an internal annular shoulder 548 that prevents rearward movement of the holder sleeve 534, and thus the gripping ferrule 536, as the gripping ferrule is radially compressed.

For example, the internal surface of the entry body housing 516 may include an annular lip 521 and an annular shoulder 533 that define an annular groove 525 having an axial dimension. The annular groove 525 receives an annular projection 527 extending radially outward from an outer surface of the insert shaft 532 and permits axial movement of the insert shaft 532 relative to the entry body housing 516 within the axial dimension of the annular groove 525.

The insert shaft 532 includes a tubular body 552 terminating at a forward flanged head portion 554. The insert shaft 532 is made from metal. The outside diameter of the tubular body 552 of the insert shaft 532 is dimensioned to be fitted within the inner diameter of the outer conductor 106 of the coaxial cable 100. Also, the inside diameter of the tubular body 552 is dimensioned to provide a passageway to receive the center conductor 102 of the cable 100 after the cable has been prepared for termination, wherein a length of the dielectric 104 has been removed from the forward end of the cable.

The support sleeve 535 is a tubular body made from plastic. The outside diameter of the tubular body of the support sleeve 535 is dimensioned to be fitted within the inner diameter of the outer conductor 106 of the coaxial cable 100. Also, the inside diameter of the tubular body of the support sleeve 535 is dimensioned to provide a passageway to receive the center conductor 102 of the cable 100 after the cable has been prepared for termination, wherein a length of the dielectric 104 has been removed from the forward end of the cable. In some aspects, the inside diameter of the tubular body of the support sleeve 535 may taper from the rear end toward the forward end, as shown in FIG. 12.

A forward region of the support sleeve 535 includes a retention structure 537 configured to receive a complementary retention structure 539 at a rearward region of the insert shaft 532. For example, as illustrated, the retention structure 537 may be an annular groove, and the retention structure 539 may be an annular projection. The retention structures 537, 539 cooperate to limit or prevent relative axial movement between the insert shaft 532 and the support sleeve 535. The support sleeve 535 may also include a forward facing annular shoulder 541 that can engage a rearward edge 553 of the insert shaft 532. The plastic support sleeve 535 may have a thicker radial wall than the metal insert shaft 532. The metal insert shaft 532 has an axial length that extends into the gripping ferrule 536, but does not extend to the rearward axial bore 546. The plastic support sleeve 535 has an axial length that extends from the metal insert shaft within the gripping ferrule 536 to the rearward axial bore 546.

The holder sleeve 534 is preferably made from an electrically conductive material, such as aluminum or brass, and has an exterior surface configured to be received within the forward axial bore 547 of the back nut housing 528. The holder sleeve 534 terminates at a rearward edge 560, which engages the annular shoulder 548 of the back nut housing 528.

The cable gripping ferrule 536 is generally in the form of a split tube having an axial gap 566 extending the full length of the ferrule. The gap 566 permits the diameter of the ferrule 536 to be reduced more easily so that the ferrule can be uniformly, radially compressed around the insert shaft 532 and the support sleeve 535 upon forward axial movement of the gripping ferrule 536, as will be discussed in further detail below. The inner surface 568 of the gripping ferrule 536 is preferably provided with structure to enhance gripping of the outer surface of the cable. Such structure may include internal threads, teeth or some other form of textured surface.

As mentioned above, the outer surface of the cable gripping ferrule 536 is provided with a circumferential ramped portion, which engages a rearward end 526 of the entry body housing 516, upon forward axial movement of the gripping ferrule 536 to radially compress the gripping ferrule 536. The ramped portion defines a conical segment of the cable gripping ferrule 536 that tapers radially inwardly in the forward direction. A rearward portion of the gripping ferrule 536 is received in an axial bore of the holder sleeve 534.

Operation and installation of the connector 500 will now be described. Initially, the end of the coaxial cable 100 that is to be inserted through the back nut housing 528 is prepared in a conventional manner. The back nut housing 528 is next threadedly coupled and rotated with respect to the front nut housing 516 to translate the front nut and back nut assemblies 512, 514 together along their central axes. As the front nut and back nut assemblies 512, 514 are translated closer together, the holder sleeve 534 engages the gripping ferrule 536 to translate the gripping ferrule 536 in an axial direction relative to the rim face 526 of the rearward threaded portion 522 (i.e., inner sleeve) of the entry body housing 516. The interlocking mating surfaces of the front nut and back nut assemblies 512, 514 cooperate to limit the amount of rotation between the front nut housing 516 and the back nut housing 528.

The relative translation between the inner sleeve of the entry body housing 516 gripping ferrule 536 causes the outer ramp portion 561 of the gripping ferrule 536 to engage the rim face 526 of the rearward threaded portion 522 (i.e., inner sleeve) of the entry body housing 516, resulting in a radial compression of the ferrule 536. The radial compression of the ferrule 536 reduces the overall diameter of the ferrule 536 and reduces the axial gap 566 of the ferrule so that the inner threaded surface 568 of the ferrule 536 bites down on the exposed portion of the outer cable conductor 106 and presses the conductor against the tubular body 552 of the insert shaft 532 and the support sleeve 535.

Figure 13:
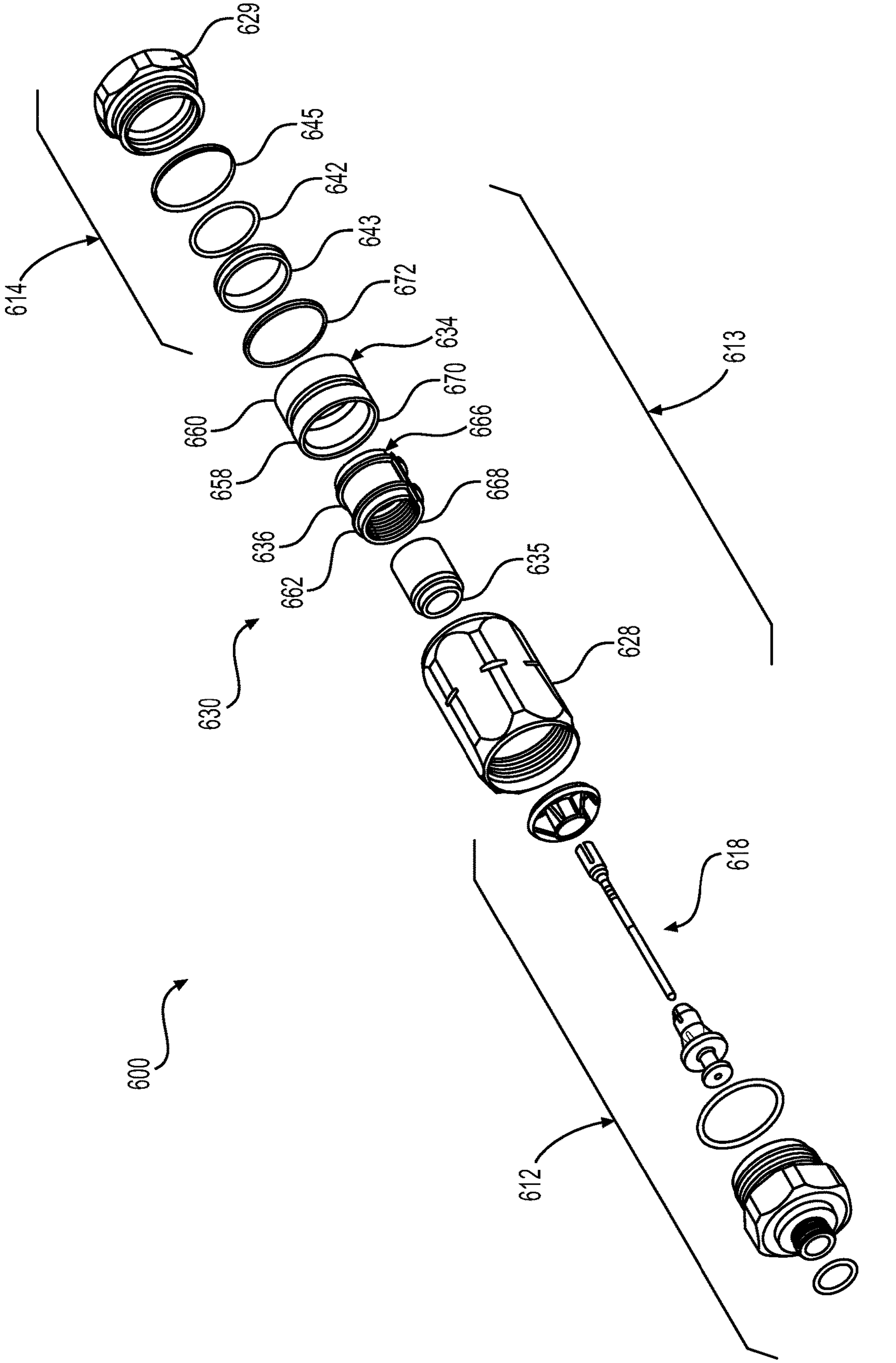
FIG. 13 is an exploded perspective view of another exemplary hardline connector in accordance with various aspects of the disclosure.
Figure 14:
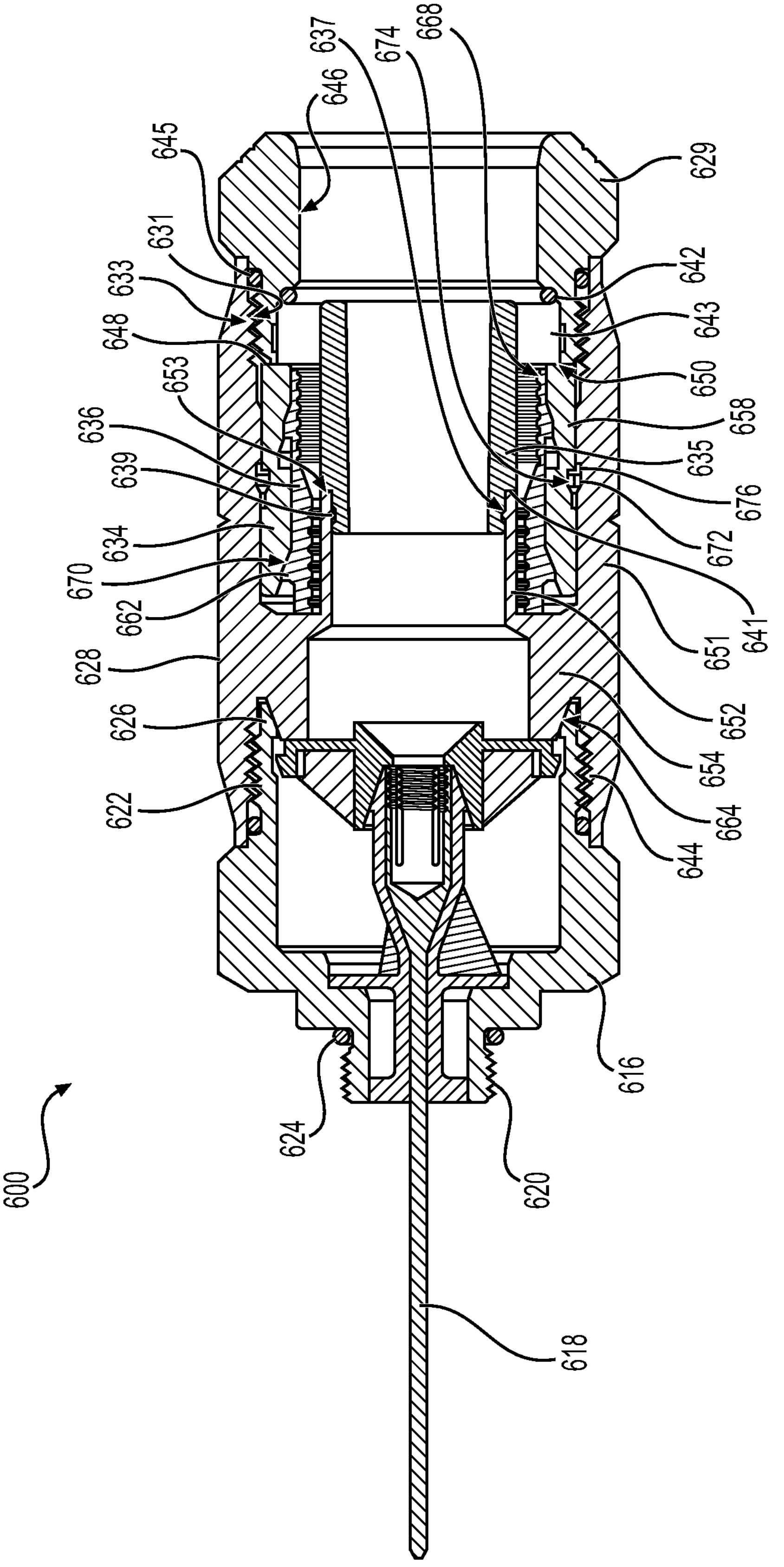
FIG. 14 is a side cross-sectional view of the connector of FIG. 13.

Referring now to FIGS. 13 and 14, another exemplary hardline connector 600 in accordance with various aspects of the disclosure is illustrated. The connector 600 includes a front nut assembly 612, a mid nut assembly 613, and a back nut assembly 614 that are configured to be removably connected to one another while providing both an electrical and mechanical connection therebetween. Although not illustrated, the connector 600 is configured such that a coaxial cable 100 can be inserted into the rearward end of the back nut assembly 614 of the connector 600.

The connector 600 includes a plurality of components generally having a coaxial configuration about an axis defined by the center conductor 102 of the coaxial cable 100. The front nut assembly 612 includes an entry body housing 616 supporting a terminal pin assembly 618 therein. Specifically, the entry body housing 616 is formed with an axial bore configured to cooperatively contain the terminal pin assembly 618 and is made from an electrically conductive material such as aluminum, brass or the like. The entry body housing 616 is formed with a threaded portion 620 at its forward end and a rearward threaded portion 622 opposite the forward threaded portion. The forward threaded portion 620 is configured to cooperate with devices located in the field that receive the forward end of the pin assembly 618. An O-ring 624 may be provided around the forward threaded portion 620 to improve the seal that is made with a device and a portion of the exterior perimeter of the entry body housing 616 may be provided with a hexagonal shape to accommodate the use of tools during installation.

The rearward threaded portion 622 of the front nut assembly 612 is configured to cooperate with the mid nut assembly 613. Specifically, the rearward threaded portion 622 includes a rim face 626 that cooperates with a nut housing 628 of the mid nut assembly 613, as will be described in further detail below.

The mid nut assembly 613 of the connector 600 includes the nut housing 628 having an axial bore and a compression subassembly 630 rotatably supported within the axial bore. The compression subassembly 630 generally includes a holder sleeve 634, a support sleeve 635, and a cable gripping ferrule 636.

The back nut assembly 614 of the connector 600 includes an end cap 629, an insert sleeve 643, a first O-ring 642, and a second O-ring 645 arranged in a coaxial relationship about the central axis of the mid nut housing 628. The first O-ring 642 improves the seal between the end cap 629 and the cable 100 upon assembly, and the second O-ring 645 improves the seal between the end cap 629 and the mid nut housing 628.

The mid nut housing 628 is made from an electrically conductive material, for example, a machined metal such as aluminum, brass, or the like, and includes a forward internally threaded portion 644 that cooperates with the rearward threaded portion 622 of the entry body housing 616 so that the two connector portions may be threadedly coupled together. Similarly, the end cap 629 may be made from an electrically conductive material, such as aluminum, brass, or the like, and includes a forward externally threaded portion 631 that cooperates with a rearward threaded portion 633 of the back nut housing 628 so that the two connector portions may be threadedly coupled together. The exterior surface of the back nut housing 628 and/or the end cap 629 are preferably provided with a hexagonal shape to accommodate the use of tools to facilitate such threaded coupling.

The end cap 629 and the insert sleeve 643 are formed with an axial bore 646 dimensioned to receive the outside diameter of the cable 100 in snug fitting relationship. At a forward end of the back nut housing 628, opposite the end cap 629, the back nut housing 628 is formed with a forward axial bore 647 communicating with the rearward axial bore 646. The end cap 629 is preferably formed with an internal annular shoulder 648 that prevents rearward movement of the holder sleeve 634, and thus the gripping ferrule 636, as the gripping ferrule 636 is radially compressed, as will be discussed in further detail below.

The back nut housing 628 includes a tubular body 651 that forms the forward axial bore 647, a forward flanged head portion 654 extending inward from the tubular body 651 of the back nut housing 628, and a tubular portion 652 that extends axially from the forward flanged head portion 654 in a rearward direction. The tubular portion 652 is spaced radially inward from the tubular body 651, and the outside diameter of the tubular portion 652 is dimensioned to be fitted within the inner diameter of the outer conductor 106 of the coaxial cable 100. Also, the inside diameter of the tubular portion 652 is dimensioned to provide a passageway to receive the center conductor 102 of the cable 100 after the cable has been prepared for termination, wherein a length of the dielectric 104 has been removed from the forward end of the cable.

The support sleeve 635 is a tubular body made from plastic. The outside diameter of the tubular body of the support sleeve 635 is dimensioned to be fitted within the inner diameter of the outer conductor 106 of the coaxial cable 100. Also, the inside diameter of the tubular body of the support sleeve 635 is dimensioned to provide a passageway to receive the center conductor 102 of the cable 100 after the cable has been prepared for termination, wherein a length of the dielectric 104 has been removed from the forward end of the cable. In some aspects, the inside diameter of the tubular body of the support sleeve 635 may taper from the rear end toward the forward end, as shown in FIG. 14.

A forward region of the support sleeve 635 includes a retention structure 637 configured to receive a complementary retention structure 639 at a rearward region of the tubular portion 652. For example, as illustrated, the retention structure 637 may be an annular groove, and the retention structure 639 may be an annular projection. The retention structures 637, 639 cooperate to limit or prevent relative axial movement between the tubular portion 652 and the support sleeve 635. The support sleeve 635 may also include a forward facing annular shoulder 641 that can engage a rearward edge 653 of the tubular portion 652. The plastic support sleeve 635 may have a thicker radial wall than the metal tubular portion 652. The metal tubular portion 652 has an axial length that extends into the gripping ferrule 636 but does not extend to the rearward axial bore 646. The plastic support sleeve 635 has an axial length that extends from the metal tubular portion 652 within the gripping ferrule 636 to the rearward axial bore 646.

The holder sleeve 634 is preferably made from an electrically conductive material, such as aluminum or brass, and includes a sleeve body 658 having an exterior surface configured to be received within the forward axial bore 647 of the back nut housing 628. The sleeve body 658 includes a retention structure 674, for example, an annular groove, at its outer surface, and the back nut assembly 628 includes a retention structure 676, for example, an annular groove, at an inner surface of the tubular body 651. The retention structures 674, 676 are configured to receive a snap ring 672 such when the snap ring 672 is received in the retention structures 674, 676, the sleeve body 658 is axially fixed relative to the back nut assembly 628. The sleeve body 658 terminates at a rearward edge 660, which engages the annular shoulder 648 of the end cap 629 and a forward end of the insert sleeve 643.

The cable gripping ferrule 636 is generally in the form of a split tube having an axial gap 666 extending the full length of the ferrule. The gap 666 permits the diameter of the ferrule 636 to be reduced more easily so that the ferrule can be uniformly, radially compressed around the tubular portion 652 and the support sleeve 635 upon forward axial movement of the support sleeve 635. The inner surface 668 of the gripping ferrule 636 is preferably provided with structure to enhance gripping of the outer surface of the cable. Such structure may include internal threads, teeth, or some other form of textured surface.

As mentioned above, the outer surface of the cable gripping ferrule 636 is provided with a circumferential ramped portion 662, which engages a forward end 670 of the holder sleeve 634, opposite the rearward edge 660, upon forward axial movement of the holder sleeve 634 to radially compress the gripping ferrule 636. The ramped portion 662 defines a conical segment of the cable gripping ferrule 636 that tapers radially inwardly in the rearward direction. A rearward portion of the gripping ferrule 636 is received in an axial bore of the holder sleeve 634.

Operation and installation of the connector 600 will now be described. Initially, the cable gripping ferrule 636, the holder sleeve 634, and the snap ring 672 are inserted into the rear end of the back nut housing 628 between the tubular body 651 and the tubular portion 652, and a forward end of the support sleeve 635 is inserted into a rear end of the tubular portion 652, as illustrated in FIG. 14.

An end of the coaxial cable 100 that is to be inserted into the rearward end of the back nut housing 628 is prepared in a conventional manner. In particular, cable preparation entails removing about 0.75 inch (19.05 mm) of cable dielectric 104, outer cable conductor 106 and cable jacket to expose a portion of the center conductor 102 that will engage the pin-terminal assembly 618 of the front nut assembly 612. In addition, about 1.25 inches (31.75 mm) of the cable dielectric 104 is removed from within the outer cable conductor 106 to provide clearance for the installation of the tubular portion 652 of the back nut housing 628, and about 0.5 inch (12.70 mm) of cable jacket is removed to make an electrical connection with the inside surface 668 of the cable gripping ferrule 636. After the cable end is prepared, it is inserted through the back nut assembly 614 and into the back nut housing 628 so that the portion of the center conductor 102 engages the pin-terminal assembly 618.

The end cap 629 is threadedly coupled and rotated with respect to the back nut housing 628 to translate the mid nut and back nut assemblies 613, 614 together along their central axes. As the mid nut and back nut assemblies 613, 614 are translated closer together, the end cap 629 and/or the insert sleeve 643 causes the forward end 670 of the holder sleeve 634 to engage the outer ramp portion 662 of the gripping ferrule 636, resulting in a radial compression of the ferrule 636. The radial compression of the ferrule 636 reduces the overall diameter of the ferrule 636 and reduces the axial gap 666 of the ferrule so that the inner threaded surface 668 of the ferrule 636 bites down on the exposed portion of the outer cable conductor 106 and presses the conductor against the tubular portion 652 of the back nut housing 628.

The back nut housing 628 is thread ably coupled and rotated with respect to the front nut housing 616 to translate the front nut and mid nut assemblies 612, 613 together along their central axes. As the front nut and back nut assemblies 612, 613 are translated closer together, the rim face 626 of the front nut housing 616 engages a forward surface 664 of the forward flanged head portion 654 of the back nut housing 628. The mating surfaces of the front nut and mid nut assemblies 612, 613 cooperate to limit the amount of rotation between the front nut housing 616 and the back nut housing 628.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A coaxial cable connector having a hybrid mandrel portion configured to enhance ground connection and radio frequency (RF) shielding of the connector comprising:

a housing portion having a rearward cable receiving end portion and a forward end portion opposite said rearward end portion;

a front portion configured to be coupled with the forward end portion of the housing portion, the front portion including an entry body housing portion and a conductive terminal pin portion extending from a forward end of the front portion;

a conductive metal tubular insert shaft portion configured to be supported within the housing portion or the front portion, the conductive metal tubular insert shaft portion having a rearward end portion;

a nonconductive plastic support sleeve portion having a forward end portion coupled with the rearward end portion of the conductive metal insert shaft portion;

a gripping portion radially surrounding the metal insert shaft portion and the plastic support sleeve portion;

an outer sleeve portion radially surrounding at least a portion of the gripping portion;

wherein the gripping portion and the outer sleeve portion are configured to be moved relative to one another in an axial direction such that the gripping portion and the outer sleeve portion are configured to engage one another, thereby causing the gripping portion to radially compress around the conductive metal insert shaft portion and the nonconductive plastic support sleeve portion; and wherein the nonconductive plastic support sleeve portion and the conductive metal insert shaft portion are configured to form a hybrid mandrel portion such that a signal pathway that radio frequency (RF) energy needs to travel along the conductive metal shaft portion is shortened relative to a combined length of the hybrid mandrel portion so as enhance ground connection and RF shielding of the connector.

2. The coaxial cable connector as defined in claim 1, wherein the conductive metal insert shaft portion includes an engagement structure configured to engage an engagement structure of the nonconductive plastic support sleeve portion to couple the conductive metal insert shaft with the nonconductive plastic support sleeve portion.

3. The coaxial cable connector as defined in claim 1, further comprising a back assembly portion configured to be coupled with the rearward end of the housing portion, the back assembly portion including an end cap.

4. The coaxial cable connector as defined in claim 3, wherein a mid assembly portion includes the housing portion, the nonconductive plastic support sleeve, and the gripping portion.

5. The coaxial cable connector as defined in claim 4, wherein the mid assembly portion further includes the conductive metal insert shaft and the outer sleeve portion.

6. The coaxial cable connector as defined in claim 1, wherein a back assembly portion includes the housing portion, the nonconductive plastic support sleeve portion, and the gripping portion.

7. The coaxial cable connector as defined in claim 1, wherein the front assembly portion includes the nonconductive plastic support sleeve portion and the conductive metal insert shaft portion.

8. A coaxial cable connector having a hybrid mandrel portion configured to enhance ground connection and radio frequency (RF) shielding of the connector comprising:

a housing portion having a rearward cable receiving end portion and an opposite forward end portion;

a front portion coupled to the forward end of the housing portion;

a conductive metal shaft portion supported within the housing portion or the front portion;

a nonconductive plastic support portion having a forward end portion coupled with a rearward end portion of the conductive metal tubular shaft portion;

a gripping ferrule portion surrounding the metal insert shaft and the plastic support sleeve and configured to be radially compressed around the conductive metal shaft portion and the nonconductive plastic support portion; and wherein the nonconductive plastic support sleeve portion and the conductive metal insert shaft portion are configured to form a hybrid mandrel portion such that a signal pathway that radio frequency (RF) energy needs to travel along the conductive metal shaft portion is shortened relative to a combined length of the hybrid mandrel portion so as enhance ground connection and RF shielding of the connector.

9. The coaxial cable connector as defined in claim 8, wherein the conductive metal tubular insert shaft includes an engagement structure configured to engage an engagement structure of the nonconductive plastic tubular support sleeve to couple the conductive metal tubular insert shaft with the nonconductive plastic tubular support sleeve.

10. The coaxial cable connector as defined in claim 8, further comprising a back nut assembly configured to be coupled with the rearward end of the nut housing, the back nut assembly including an end cap.

11. The coaxial cable connector as defined in claim 10, wherein a mid nut assembly includes the nut housing, the nonconductive plastic tubular support sleeve, and the tubular gripping ferrule.

12. The coaxial cable connector as defined in claim 11, wherein the mid nut assembly further includes the conductive metal tubular insert shaft and the tubular outer sleeve.

13. The coaxial cable connector as defined in claim 8, wherein a back nut assembly includes the nut housing, the nonconductive plastic tubular support sleeve, and the tubular gripping ferrule.

14. The coaxial cable connector as defined in claim 8, wherein the front nut assembly includes the nonconductive plastic tubular support sleeve and the conductive metal tubular insert shaft.

15. The coaxial cable connector as defined in claim 8, wherein the front nut assembly includes an entry body housing and a conductive terminal pin extending from a forward end of the front nut assembly.

16. A coaxial cable connector having a hybrid mandrel portion configured to enhance ground connection and radio frequency (RF) shielding of the connector comprising:

an assembly portion having a rearward cable receiving end and an opposite forward end;

a hybrid mandrel portion comprising a conductive forward portion and a nonconductive rearward portion, the hybrid mandrel portion being supported within the assembly portion; and wherein the nonconductive rearward portion and the conductive forward portion are configured such that a signal pathway that radio frequency (RF) energy needs to travel along the conductive forward portion is shortened relative to a combined length of the hybrid mandrel portion so as enhance ground connection and RF shielding of the connector.

17. The coaxial cable connector as defined in claim 16, wherein the conductive forward portion of the inner sleeve is a conductive metal tubular insert shaft, the conductive metal tubular insert shaft having a rearward end portion, and wherein the nonconductive rearward portion is a nonconductive plastic tubular support sleeve having a forward end portion coupled with the rearward end portion of the conductive metal tubular insert shaft.

18. The coaxial cable connector as defined in claim 16, wherein the conductive forward portion includes an engagement structure configured to engage an engagement structure of the nonconductive rearward portion to couple the conductive forward portion with the nonconductive rearward portion.

19. The coaxial cable connector as defined in claim 16, further comprising a back nut assembly configured to be coupled with the rearward end of the nut housing, the back nut assembly including an end cap.

20. The coaxial cable connector as defined in claim 19, wherein a mid nut assembly includes the nut housing, the nonconductive plastic tubular support sleeve, and the tubular gripping ferrule.

* * * * *